(12) United States Patent
Goertz et al.

(10) Patent No.: US 6,173,295 B1
(45) Date of Patent: Jan. 9, 2001

(54) METHOD, SYSTEM, AND PROGRAM FOR CREATING A JOB TICKET INLCUDING INFORMATION ON COMPONENTS AND PRINT ATTRIBUTES OF A PRINT JOB

(75) Inventors: Chris Samuel Goertz, Longmont; Leonard Corning Lahey, Boulder; Robert Curt Nielsen, Longmont; Dwight Ross Palmer, Longmont; Luana Vigil, Longmont, all of CO (US)

(73) Assignee: International Business Machines Corporation, Armonk, NY (US)

( * ) Notice: Under 35 U.S.C. 154(b), the term of this patent shall be extended for 0 days.

(21) Appl. No.: 08/929,609

(22) Filed: Sep. 15, 1997

(51) Int. Cl.$^7$ .............................. G06F 15/00; G06F 17/00
(52) U.S. Cl. ............................................. 707/505; 707/527
(58) Field of Search ........................... 707/505; 358/449, 358/448, 461, 146, 153, 148.07; 355/40; 395/111, 117, 110, 672; 705/22, 26, 28, 29, 20, 1, 17, 27

(56) References Cited

U.S. PATENT DOCUMENTS

| | | |
|---|---|---|
| 4,970,554 | 11/1990 | Rourke . |
| 5,450,571 | 9/1995 | Rosekrans et al. . |
| 5,467,434 | 11/1995 | Hower, Jr. et al. . |
| 5,524,085 * | 6/1996 | Bellucco et al. ...................... 364/514 |
| 5,718,520 * | 2/1998 | MacKay ................................ 400/61 |
| 5,760,775 * | 6/1998 | Sklut .................................... 345/349 |

OTHER PUBLICATIONS

IBM Print OnDemand Executive Summary and Planning Guide for RPQs 8B3967 and 8B3968 for the IBM 3900 Model DR1/DR2 High Resolution Printing System, Document No. G544–5324–00, dated Jun. 19, 1996.

IBM Print OnDemand User's Guide, Document No. G544–5325–00, Dated Jun. 20, 1996, author Dave Thomson, pp. 25–26, 39–42, and 45–46.

IBM OnDemand for AIX Using the Administrator Interface Version 2, Document No. S544–5279–00, dated May 1996.

* cited by examiner

*Primary Examiner*—Joseph H. Feild
*Assistant Examiner*—Alford W. Kindred
(74) *Attorney, Agent, or Firm*—David W. Victor; Konrad Raynes & Victor LL

(57) ABSTRACT

The present invention concerns a method, apparatus, and article of manufacture for creating a job ticket on a computer, wherein the job ticket includes information on components and print attributes of a print job. The created job ticket includes an identification record including information identifying the job ticket, a document record including information on a document included in the print job and print attributes for the document, and an item record including information on an item that is a component of the document and print attributes for the item. The item may be a print image file. The job ticket may further include a record including information on scheduling options for the print job. The item record is arranged in a lower hierarchical relationship to the document record such that the print attributes for the document apply to the item. After creating the job ticket, the present invention processes the job ticket and, then, transmits the processed job ticket to a printer. A GUI program may be installed on the computer used to create the job ticket. In such case, the user would use an input device, such as a mouse pointer and keyboard, to enter information in the job ticket records.

42 Claims, 19 Drawing Sheets

METHOD, SYSTEM, AND PROGRAM FOR CREATING A JOB TICKET INLCUDING INFORMATION ON COMPONENTS AND PRINT ATTRIBUTES OF A PRINT JOB

CROSS-REFERENCE TO RELATED APPLICATIONS

This application is related to the following co-pending and commonly-assigned applications:

Application Ser. No. 08/932,065, filed on same date herewith, by Leonard Corning Lahey, Deborah Elisabeth Neuhard, and Dwight Ross Palmer, entitled "A Method For Organizing Files Associated With A Job Ticket In A Network Printing System," attorney's docket number AM9-97-113;

Application Ser. No. 08/929,997, filed on same date herewith, by Deborah Elisabeth Neuhard, Robert Curt Nielsen, Dwight Ross Palmer, and Luana Vigil, entitled "A Method For Organizing Raster Image Processor Files Associated With a Job Ticket Used in a Network Printing System," attorney's docket number AM9-97-101;

Application Ser. No. 08/932,066, filed on same date herewith, by Deborah Elisabeth Neuhard, Robert Curt Nielsen, Dwight Ross Palmer, and Luana Vigil, entitled "Method For Customizing Print Attribute Choices Based On Selected Model, Media, And Printer," attorney's docket number AM9-97-102;

Application Ser. No. 08/931,013, filed on same date herewith, by Leonard Corning Lahey, Dwight Ross Palmer, and John Stuart Walker, entitled "A Method for Organizing Files in a Library in a Network Printing System," attorney's docket number AM9-97-103;

Application Ser. No. 08/929,844, filed on same date herewith, by Leonard Corning Lahey, entitled "Method for Real Time Customization of a Dialog Box for Accessing a Library Within a Network Printing System," attorney's docket number AM9-97-114;

Application Ser. No. 08/929,637, filed on same date herewith, by Kate Goes In Center, Deborah Elisabeth Neuhard, Robert Curt Nielsen, and Dwight Ross Palmer, entitled "A System, Method, and Program for Using Animations to Show Page Layout Combinations in a User Interface for Submitting Print Jobs," attorney's docket number AM9-97-098; and Application Ser. No. 08/929,627, filed on same date herewith, by Leonard Corning Lahey, Deborah Elisabeth Neuhard, and Dwight Ross Palmer, entitled "A System, Method, and Program for Including Within a User Interface Having File Menu Options an Ability to Make a New File Like a Pre-Existing File Wherein Any Pre-Existing File Can Be a Template for a New File," attorney's docket number AM9-97-099;

all of which applications are incorporated herein by reference.

BACKGROUND OF THE INVENTION

1. Field of the Invention

The present invention relates generally to a job ticket that includes information describing the components and print attributes of a print job and, in particular, to a method, apparatus, and article of manufacture for creating a job ticket using a graphical user interface.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, prior art systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user.

Job tickets typically only define the print attributes for a single file. However, a document may be comprised of multiple files, each having one or more print attributes. In the prior art, an user putting together a document comprised of multiple files would have to manually keep track of the location of the different files and manually assemble the files for printing. Moreover, the user would have to insure that the job tickets submitted for each file include the proper print attributes. Print jobs comprised of multiple documents, which are further comprised of multiple files, only increase the complexity of the user's task. Thus, there is a need in the art for network printing systems that eliminate these problems and facilitate the printing of complex documents comprised of multiple files stored throughout the network printing system.

SUMMARY OF THE INVENTION

To address the requirements described above, the present invention discloses a method, apparatus, and article of manufacture for creating a job ticket on a computer, wherein the job ticket includes information on components and print attributes of a print job. The created job ticket includes an identification record including information identifying the job ticket, a document record including information on a document included in the print job and print attributes for the document, and an item record including information on an item that is a component of the document and print attributes for the item. The item record is arranged in a lower hierarchical relationship to the document record. Further, the print attributes for the document apply to the item. After creating the job ticket, the present invention processes the job ticket and, then, transmits the processed job ticket to a printer.

In alternative embodiments, the step of creating the job ticket may further include the step of creating a record including information on scheduling options for the print job. In still further embodiments, the item record identifies a file stored in a computer readable medium and information on the location of the file. The computer would process the job ticket and access the file based on the file location information. The computer would then transmit the processed job ticket and a copy of the accessed file over a network to a server. The server would generate a print file from the processed job ticket and transmitted file and transmit the print file to a printer.

In still further embodiments, a monitor and input device may be attached to the computer. In such case, the step of creating the job ticket would further include the steps of displaying fields on the monitor in which information on the identification of the job ticket, document, item, and print attributes thereof could be entered using the input device.

It is an object of the present invention to create a job ticket that provides an improved system for organizing the information needed to prepare a print job comprised of multiple file items having different print attributes.

It is a further object of the present invention to provide in a single job ticket information on the location of all files included in the print job.

It is still a further object of the present invention to arrange components of the print job in a hierarchical relationship, wherein print attributes set at one level apply to lower hierarchical levels. This aspect of the present invention further insures that component file items and groups of file items within a document having common print attributes will be printed in accordance with such common print attributes.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
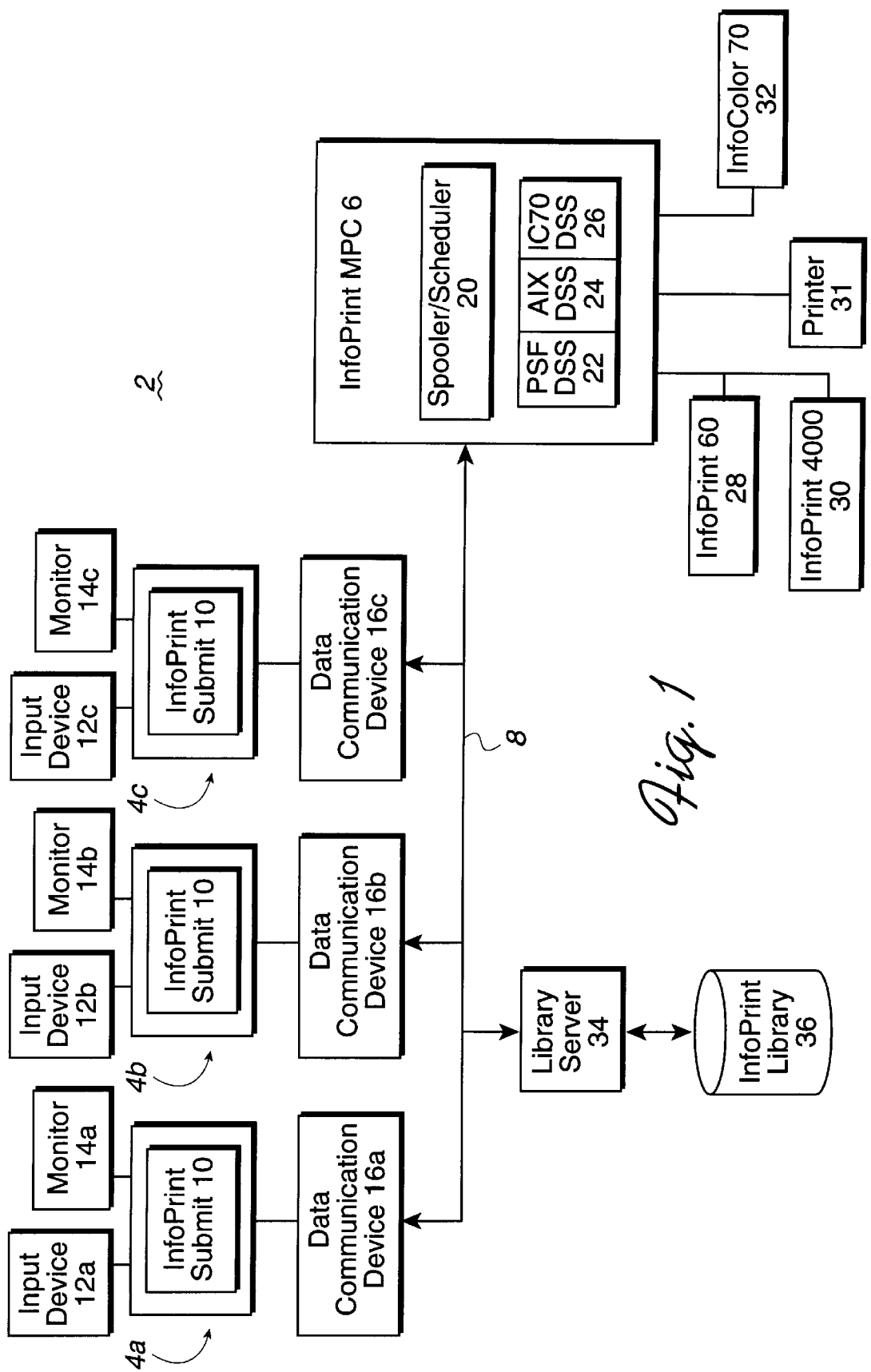
FIG. 1 is a block diagram illustrating an exemplary hardware environment for a network printing system in accordance with the present invention.

FIG. 1 shows a preferred embodiment of a network printing system 2 adapted to incorporate the present invention. The network printing system 2 comprises a plurality of client computers 4a, b, c that are connected to an InfoPrint Multiple Printer Controller (MPC) server 6 via a network 8 (e.g., Token-ring, LAN, Ethernet, WAN, TCP/IP, etc.).

In the preferred embodiment, the client computers 4a, b, c comprise personal computers that execute under the control of an operating system, such as the WINDOWS operating system. However, those skilled in the art will recognize that the client computers 4a, b, c could comprise any type of computer such as a workstation, mainframe, etc., and the operating system could comprise any operating system, such as OS/2, OS/390, MVS, VM, AIX, MACINTOSH, UNIX, etc. Installed on each client computer 4a, b, c is InfoPrint Submit software 10. The InfoPrint Submit software 10 configures the client computers 4a, b, c to allow the user to create and submit a job ticket in accordance with the present invention. Attached to each client computer 4a, b, c is an input device 12a, b, c (e.g., keyboard, mouse pointing device, voice activated input device, touch sensitive display, etc.), monitor 14a, b, c (e.g., CRT, LCD displays, etc.), as well as a data communication device 16a, b, c (e.g. modems, network interfaces, etc.) to interface with the network 8.

In the preferred embodiment, the InfoPrint MPC server 6 is an RS/6000 workstation that executes under the control of an AIX operating system. However, those skilled in the art will recognize that the InfoPrint MPC server 6 could be comprised of any type of computer such as a personal computer, workstation, server, minicomputer, mainframe, etc., and the operating system could comprise any operating system, such as OS/390, MVS, VM, OS/2, WINDOWS, MACINTOSH, UNIX, etc. Installed in the InfoPrint MPC server 6 is a spooler/scheduler 20, a Print Services Facility (PSF) device specific subsystem (DSS) 22, an AIX DSS 24, and an IC70 DSS 26.

The spooler/scheduler 20 is comprised of the InfoPrint executable code and includes a suite of applications. The spooler/scheduler 20 receives print jobs from the client computers 4a, b, c and generates printer files that are transmitted to a printer 28, 30, 31 or 32 that can appropriately handle the print job. In this way, the user may elect to not specify a printer in the network printing system 2 and let the spooler/scheduler 20 select an appropriate printer 28, 30, 31 or 32.

After processing the print job and selecting a destination printer 28, 30, 31 or 32 for the job, the spooler/scheduler 20 sends the print job to one of the device specific subsystems PSF DSS 22, AIX DSS 24, and IC70 DSS 26. The DSS programs 22, 24, 20 and 26 are device drivers for driving printers 28, 30, 31, 32 attached to the InfoPrint MPC server 6, wherein the PSF DSS 22 drives printers 28 and 30, the AIX DSS 24 drives printer 31, and the IC70 DSS 26 drives printer 32. In the preferred embodiment shown in FIG. 1, the printers attached to the InfoPrint MPC server 6 include an InfoPrint/60 printer 28, an InfoPrint/4000 printer 30, and an InfoColor/70 printer 32.

Also connected to the network printing system 2 is a library server 34 storing an InfoPrint library 36 of files and job tickets. In preferred embodiments, the library server 34 is a RISC System/6000 that executes under the AIX operating system and includes the IBM DB2/6000 database software which provides database management services for the library 36. However, those skilled in the art will recognize that the library server 34 could comprise a personal computer, workstation, mainframe etc. and the operating system could comprise OS/2, WINDOWS, UNIX, O/S 390, MVS, VM, etc., and that alternative database programs could be used in lieu of IBM's DB2/6000. In alternative embodiments, the InfoPrint MPC server 6 may be the hardware platform for the library server 34. The InfoPrint library 36 is a complete document storage system that archives printing files, application source data, fonts, images, TIFF data, etc. The client computers 4a, b, c may directly access, store, view and retrieve files and job tickets from the InfoPrint library 36. The hardware and software arrangement of the library server 34 and InfoPrint library 36 is further described in Application Ser. No. 08/931,013, filed on same date herewith, by Leonard Corning Lahey, Dwight Ross Palmer, and John Stuart Walker, entitled "A Method for Organizing Files in a Library in a Network Printing System," attorney's docket number AM9-97-103 and Application Ser. No. 08/929,844, filed on same date herewith, by Leonard Corning Lahey, entitled "Method for Real Time Customization of a Dialog Box for Accessing a Library Within a Network Printing System," attorney's docket number AM9-97-114. Both these applications were incorporated by reference above.

It should be appreciated that, in alternative embodiments, the network printing system 2 may be comprised of components and products other than those discussed above. Moreover, the network printing system 2 can be implemented on different operating systems and hardware. For instance, hardware and software from manufacturers other than IBM may be used to perform the functions of the InfoPrint MPC server 6, the spooler/scheduler 20 and DSS drivers 22, 24, and 26, the library server 34, and the InfoPrint library 36. Printers having printing capabilities different from the disclosed printers 28, 30, and 32 may be used. Further, in alternative embodiments, any number of client computers 4a, b, c having alternative user interfaces may be used. Still further, the client computers 4a, b, c may connect to the InfoPrint MPC server 6 via multiple networks and remote lines. Those skilled in the art will recognize that other alternative hardware and software environments may be used without departing from the scope of the present invention. As such, the exemplary environment in FIG. 1 is not intended to limit the present invention.

Job Ticket

The present invention includes the data structure of an electronically-stored job ticket and the computer-implemented method, apparatus, and article of manufacture used to create the job ticket. The job ticket of the present invention maintains information on print attributes and the location of the print files which comprise the print job.

Figure 2:
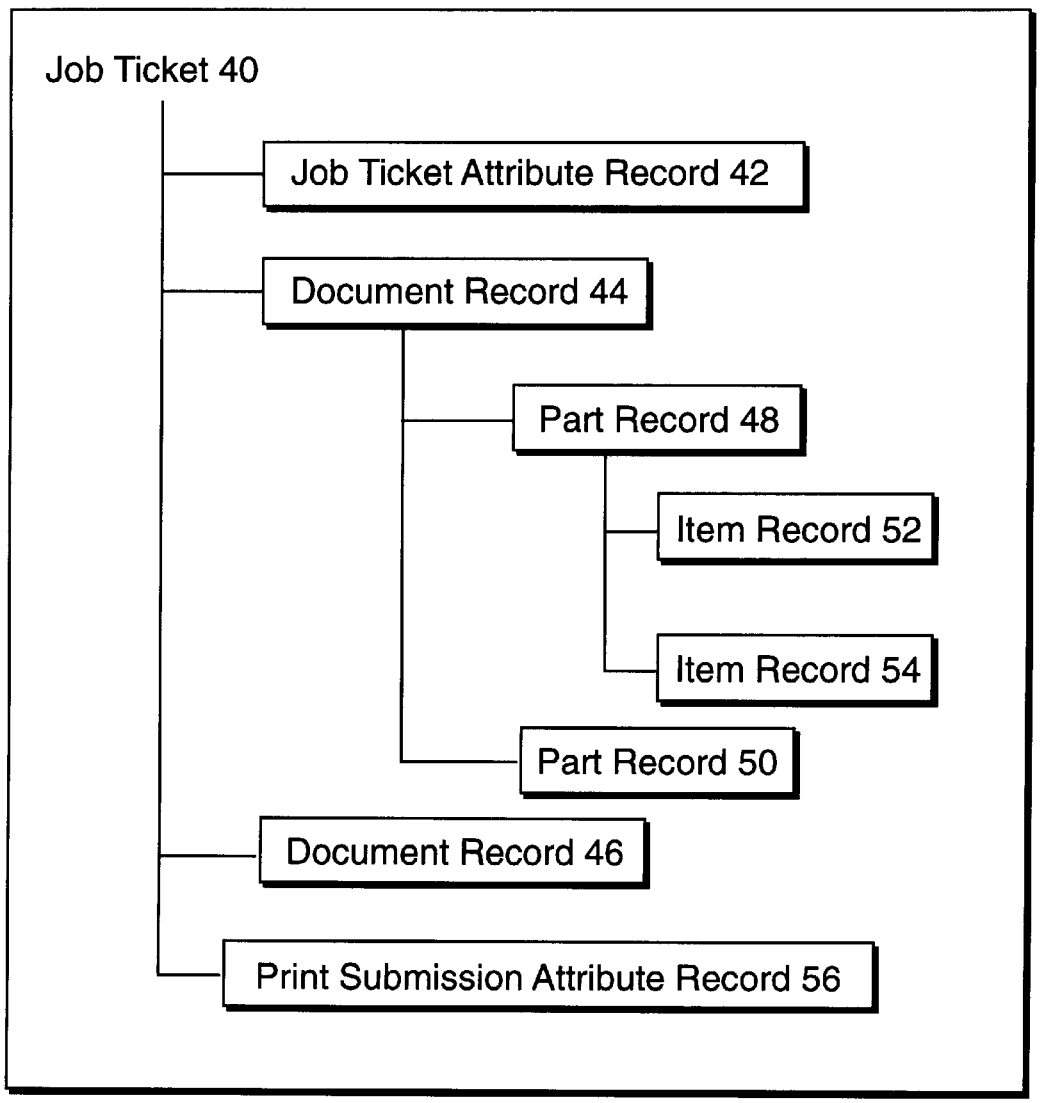
FIG. 2 is a block diagram illustrating a preferred embodiment of a job ticket data structure in accordance with the present invention.

FIG. 2 shows a preferred embodiment of the hierarchical tree structure arrangement of data within a job ticket 40 as stored in a data structure in a memory or as stored as a file in a data storagle device. The first record in the job ticket 40 is a job ticket attribute record 42, which includes identification information, such as the file name containing the job ticket 40, a job ID, the customer name, etc.

Within each job ticket 40 are also one or more document records, wherein FIG. 2 shows two document records 44 and 46. The document records 44, 46 include all the information the InfoPrint MPC server 6 needs to print a document included in the print job.

Each document record 44, 46 is associated with one or more part records. Document record 44 is associated with two part records 48 and 50. A part is the smallest component submitted to the printer for printing. For instance, if the document is comprised of a black and white text body with a color cover, one part 48 would be the black and white text and another part 50 would be the color cover.

Each part record 48, 50 is a grouping of one or more item records. Part record 48 is a grouping of two item records 52 and 54. An item record includes information on a component of the print job. In preferred embodiments, item records 52, 54 may include information on the following item types: a file item; a hardcopy item; a library file item; variable data; and an inventory item.

A file item is a print image file, such as a TIFF, PostScript, RIP, PDF or PCL file. Included in the item records 52, 54 is information on the location of the item, e.g., the location of the print image file within the network printing system 2 and the location of the source file from which the print image file item was generated. The user may want to know the location of the source file to modify the contents of the print image. The location information included in the item records 52, 54 is used to access the print image files for printing.

A hardcopy item is a list of scanned TIFF files.

A library file item is a file archived in the library 36. The library file item may include information on the location of the library file within the library 36.

Variable data includes files used to create customized print settings to add to the print job, e.g., adding the name and address of the customer to the printed document.

The inventory item includes information on an item to be packaged with the document 44, 46 which is not printed, such as a diskette, CD-ROM, etc.

Thus, an "item" includes print image files comprised of data representing graphical images that are associated with the file item, hardcopy item, library file item or variable data item. The item records 52, 54 also include information on files associated with the print image files for the item. Such associated files may include a source file from which the file item was generated, a Raster Image Processor format of the file item, and a viewable version of the format item. For instance, if the file item is a PostScript file, then the viewable version would be in the PDF file format. Other file types may also be associated with the items.

In the present invention, the job ticket 40 stores print attribute information, such as information on the layout of the printed page, the printer selected, the alignment of the page, and the look of the page, for each element included in the job ticket 40. As used herein, the term "element" means any of the document records 44, 46, part records 48, 50, and item records 52, 54 included in the job ticket 40. Any print attribute information set for an element at a higher hierarchical level in the tree applies to the elements at the lower hierarchical levels which branch from that higher element. For instance, print attribute information set at the document record 44 level automatically applies to the part records 48, 50 and the item records 52, 54 which branch from the document record 44. Print attribute information set at the part record 52 level likewise applies to the items 52, 54 branching therefrom. In this way, the lower level elements inherit the print attributes of the higher level elements from which they branch.

The print submission attribute record 56 includes information on the print job, such as scheduling options, priority, difficulty, etc. The information in the print submission attribute record 56 does not affect what is printed, but instead concerns the work flow of the print job.

In preferred embodiments, print attribute information is stored as key/value pairs. The key is the mode or name of the attribute and the value is the value for the operation. For instance, to indicate a selection of a media type for a print job, the print attribute information would be stored as Input Bin/Tray 1. The key is the input bin containing the selected media, and the user selected value is the first tray. This key/value method for representing print attribute information is readily extendible. To add additional values for specific print attribute types, the new value would be described with reference to its key. Thus, when the InfoPrint Submit software 10 and print driver programs 22, 24, 26 are processing the print attribute information, they immediately recognize the operation the value represents.

InfoPrint Submit Software

The job ticket 40 may be created on the client computer 4a, b, c using the InfoPrint Submit software 10 installed thereon. The InfoPrint Submit software 10 includes a graphical user interface (GUI) displayed on the monitor 14a, b, c that the user may use to create the job ticket 40. The InfoPrint Submit software I0 then translates the job ticket 40 created thereby to a format compatible with the InfoPrint MPC server 6.

The client computer 4a, b, c transmits this translated job ticket 40 along with the items identified in the item records 52, 54 to the InfoPrint MPC server 6 over the network 8. The InfoPrint MPC server 6 uses the information in the translated job ticket 40 to process the transmitted items 52, 54 and generate printer files based thereon. The InfoPrint MPC server 6 then selects an appropriate printer 28, 30, 31 or 32, to print the print job and transmits the printer files to the selected printer 28, 30, 31 or 32 for printing.

When printing copies of the items or a part including a group of items, the InfoPrint MPC server 6 prints a cover sheet on top of each set of copies including the information in the job ticket attribute record 42 to identify the set of copies. The user can then gather the copies generated at different printers throughout the network printing system 2 and assemble the final document using the information on the cover sheet for guidance.

In this way, the present job ticket invention maintains information on all the documents included in a customer order and all information needed by the InfoPrint MPC server 6 to print the different documents within a customer order.

Graphical User Interface

FIGS. 3, 4a, 4b, 4c, 5a, 5b, 6a, 6b, 6c, 7a, 7b, 8, 9, and 10 are illustrations of the graphical user interface (GUI) 60 provided by the InfoPrint Submit software 10. The user creates the job ticket 40 by entering information into different fields and selecting specific options presented in the GUI 60. Standard user interface mechanisms are preferably implemented in the GUI 60 to provide the user with the necessary functionality and ease of use.

Figure 3:
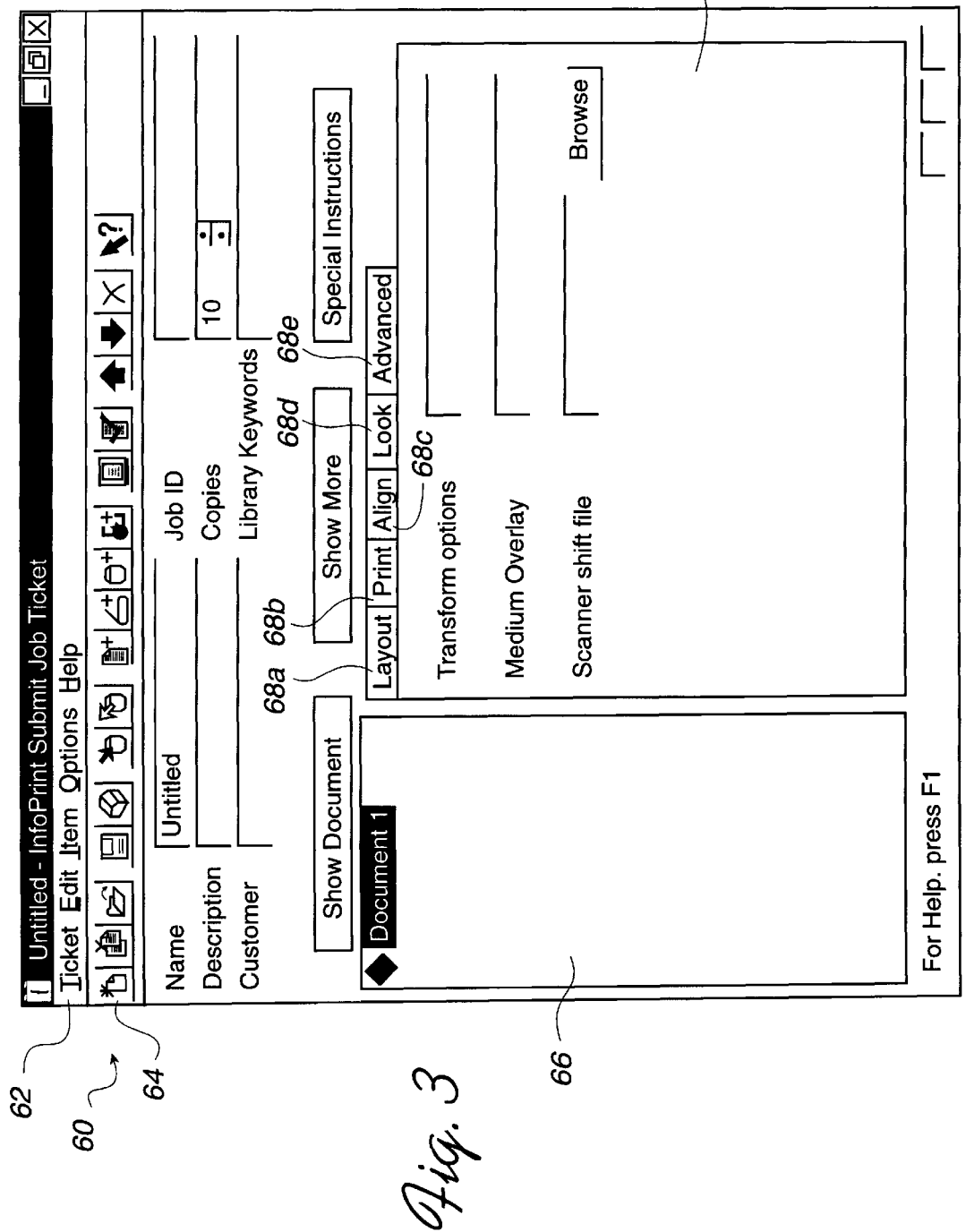
FIGS. 3, 4a, 4b, 4c, 5a, 5b, 6a, 6b, 6c, 7a, 7b, 8, 9, and 10 illustrate embodiment of a graphical user interface (GUI) displayed on a monitor in accordance with the present invention.

FIG. 3 shows the GUI 60 presented to the user upon selecting the job ticket option via an icon or command. At the upper portion of the GUI 60 is a main menu item bar 62 that includes main menu items Ticket, Edit, Item, Options, and Help. Selecting one of the main menu items with a mouse or keyboard command, invokes a further submenu of functions available to the user. Table 1 shows the submenus for each main menu item and functions included therein. Table 2 shows all the functions associated with each main menu item and provides a description of the behavior of each of the functions. Below the main menu item bar 62 is a tool bar 64 comprised of icons that represent certain functions. Below the tool bar 64 is an area presenting six fields labeled Name, Description, Customer, Job ID, Copies, and Library. These six fields comprise the information in the job ticket attribute record 42. The user places the cursor in one of the fields with the mouse and then enters the identification information.

The GUI 60 further includes a tree section 66 for displaying the elements (document records 44, 46 and item records 52, 54) associated with the job ticket 40. FIG. 3 shows only a single document element, Document 1. Associated with each element in the tree section 66 are print attribute page tabs 68a, b, c, d, e, which in the preferred embodiment are radio buttons displayed on the GUI 60. The user can cause the display of a Layout, Print, Align, Look, and Advanced print attribute page 70a, b, c, d, or e by selecting one of the corresponding print attribute page tabs 68a, b, c, d, e. FIG. 3 illustrates the Advanced print attribute page 70e, which includes fields in which the user may specify a transform option to override any conflicting attributes and to build a new document object.

Figure 4A:
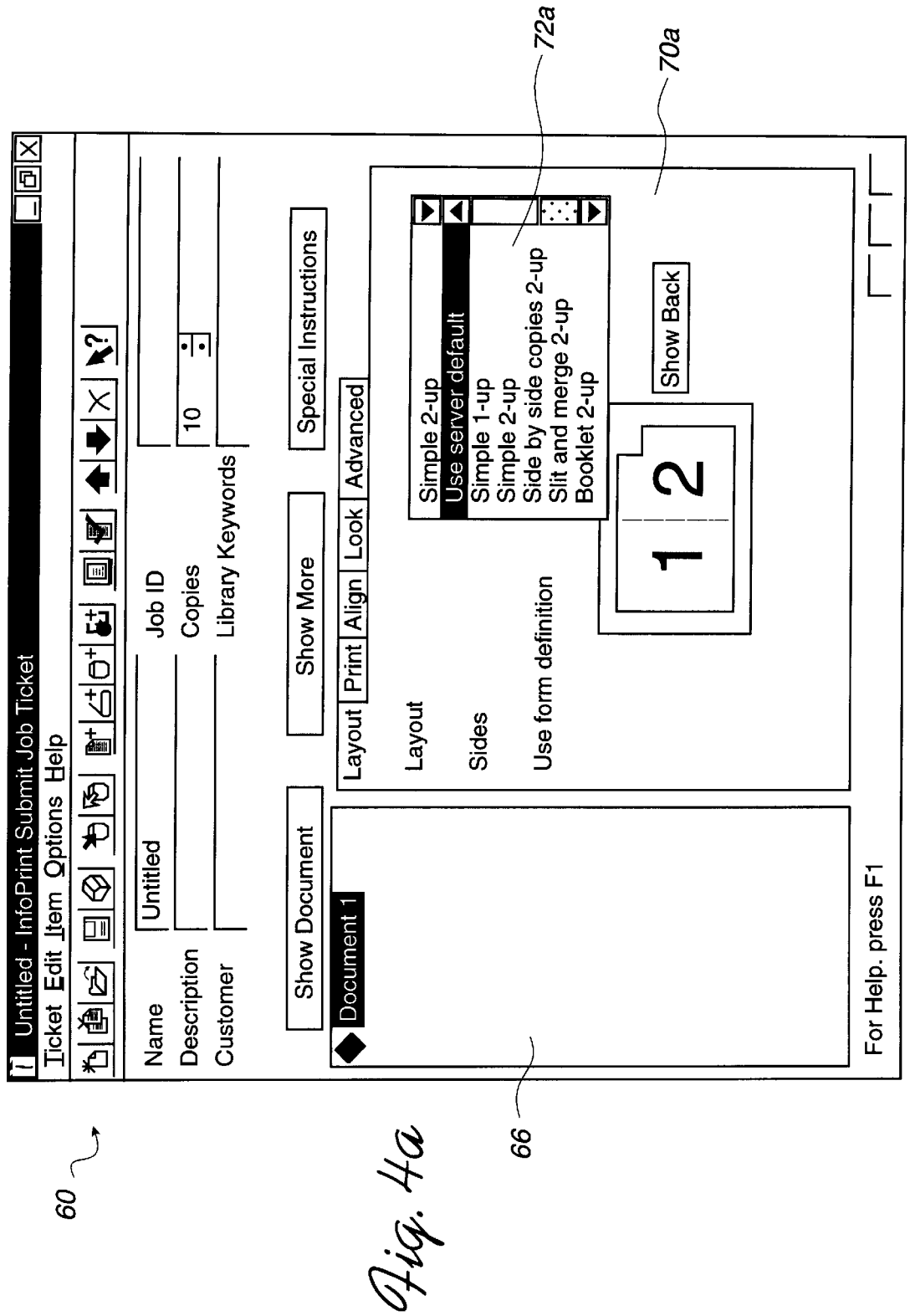
Figure 4B:
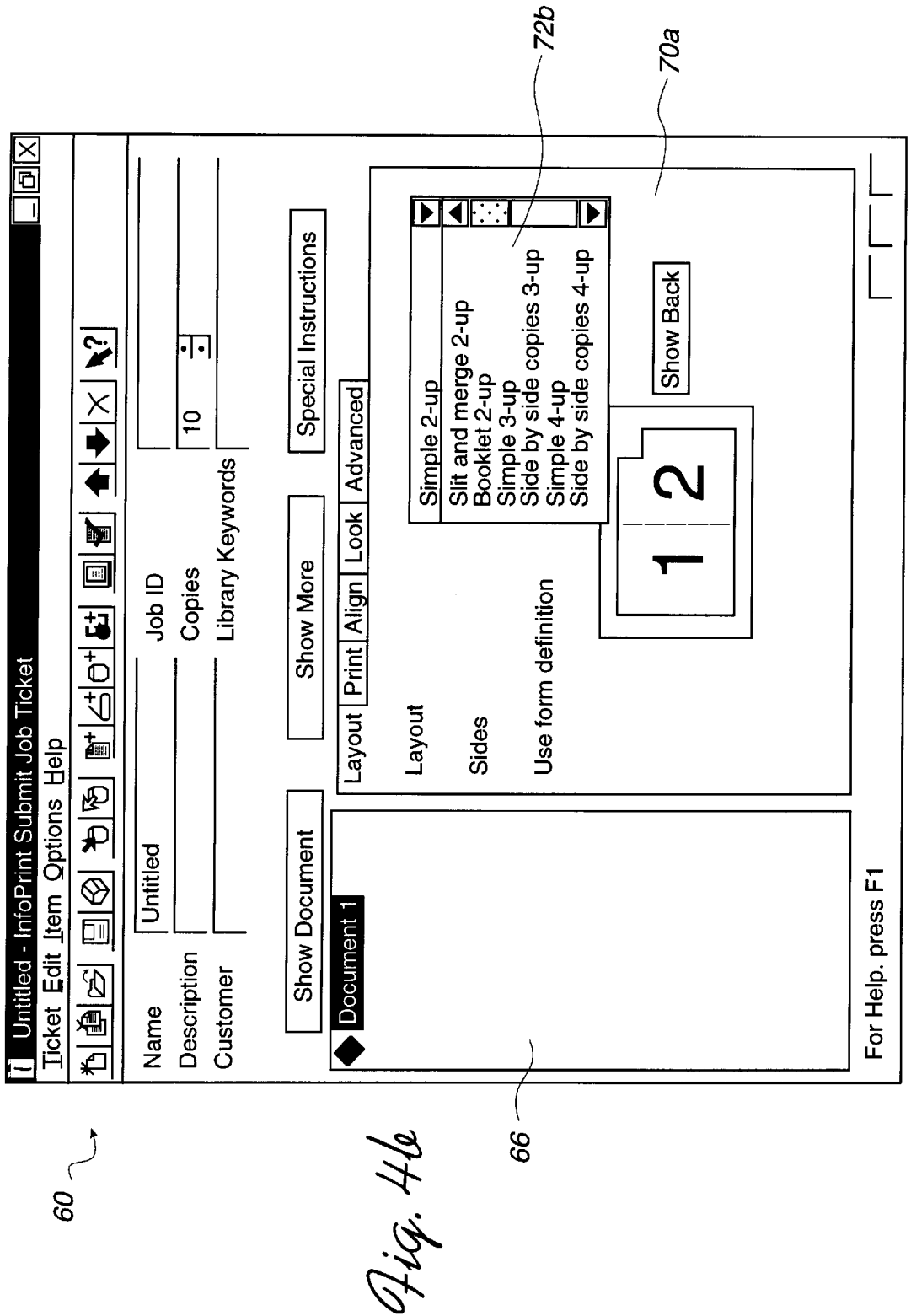
Figure 4C:
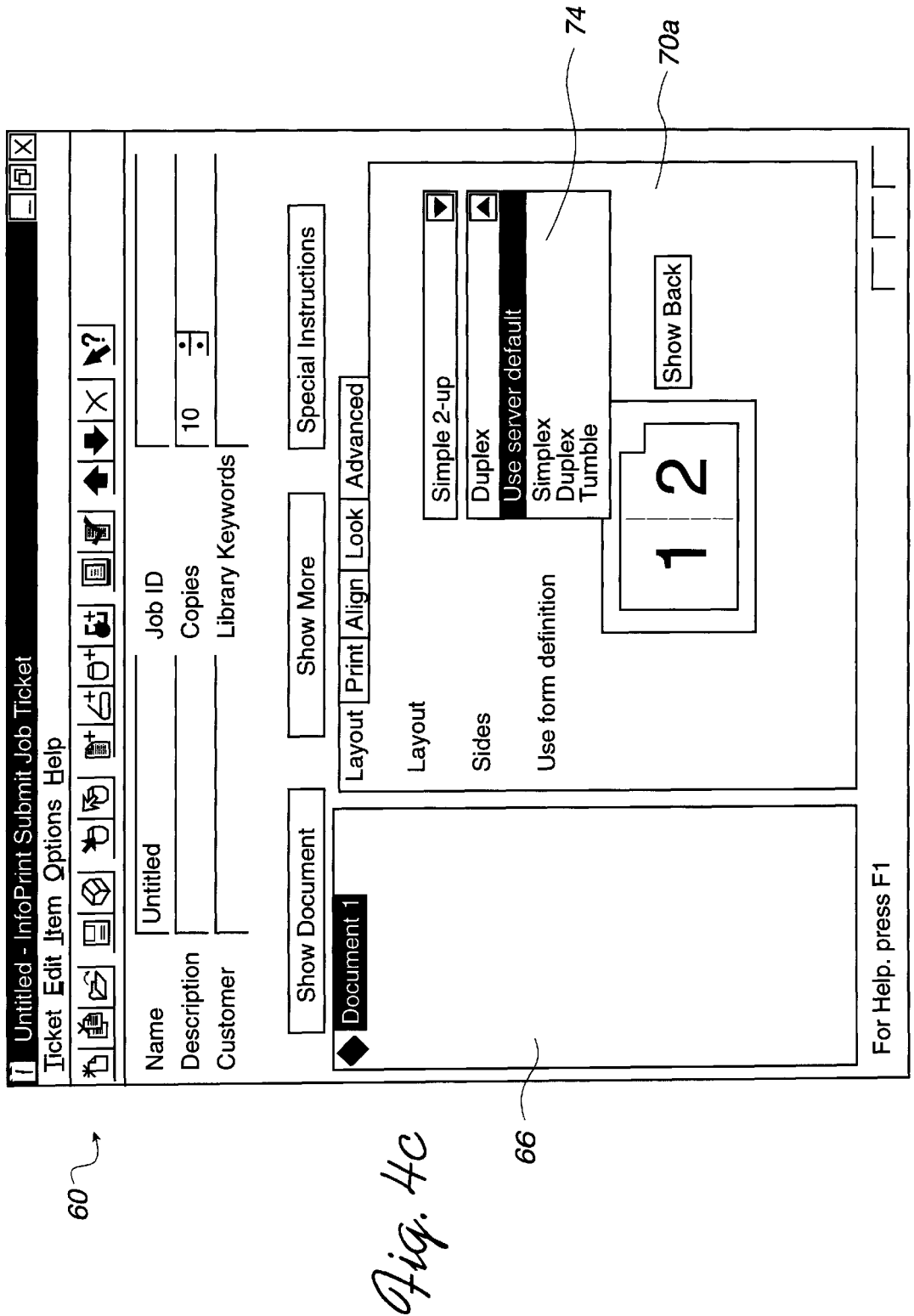

FIGS. 4a, 4b, 4c, 5a, 5b, 6a, 7b, 7c, 8a, and 8b show the print attribute pages 70a, b, c, d associated with Document 1 in the tree section 66. Table 3 provides the print attribute pages 70a, b, c, d, e available for each type of element. FIGS. 4a, 4b, and 4c illustrate a preferred embodiment of the Layout attribute page 70a, in which the user may specify the layout of the printed pages. FIGS. 4a, b show drop down menus 72a, b, respectively, of layout options, e.g., whether the pages are printed side by side, booklet style, etc. FIG. 4c shows a drop down mcnu 74 of side options, e.g., to print on two sides, one side, etc. Table 4 provides a description of the values in the Layout attribute page 70a and the behavior of the Layout attributes.

Figure 5A:
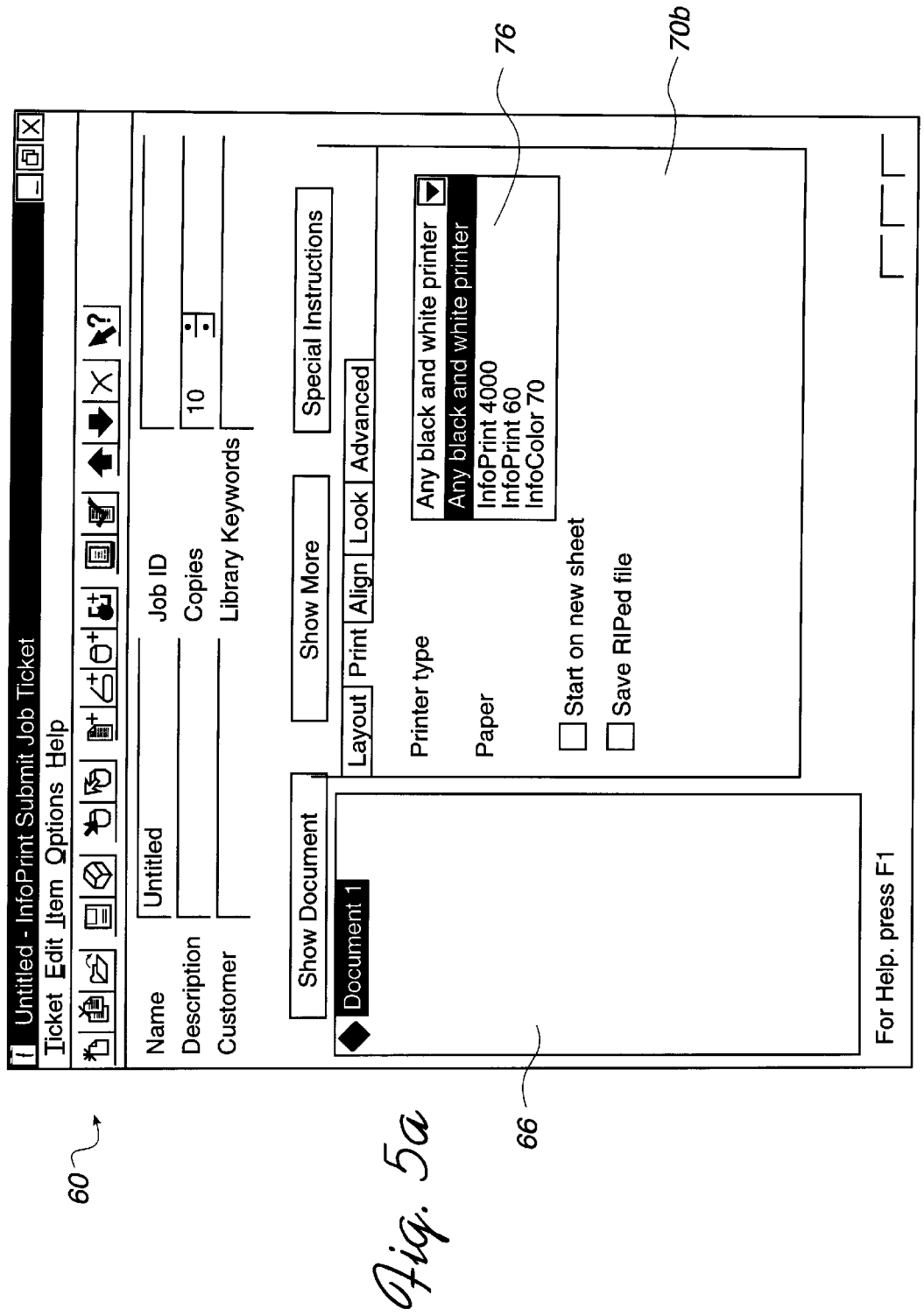
Figure 5B:
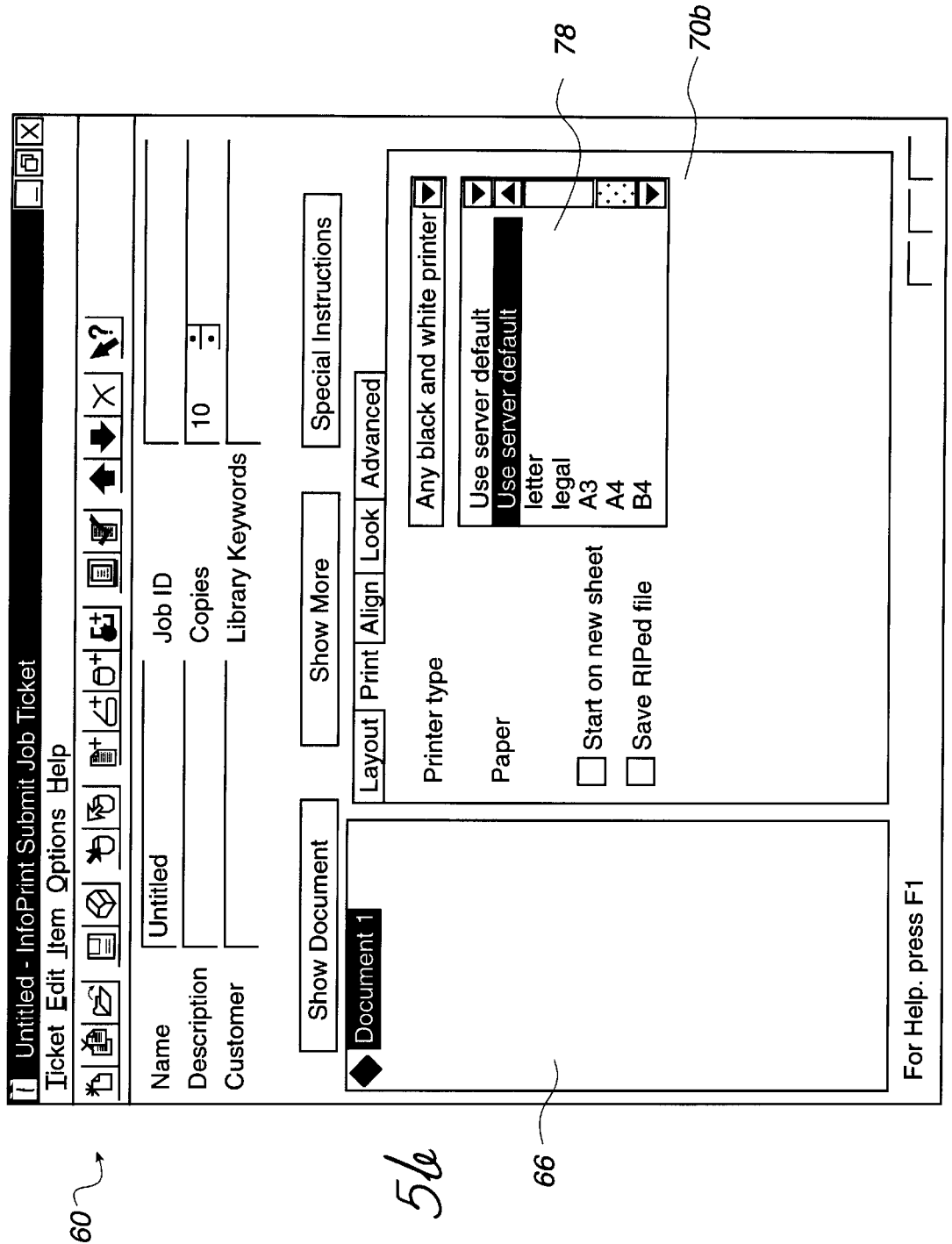

FIGS. 5a, b illustrate a preferred embodiment of the Print attribute page 70b. FIG. 5a shows a drop down menu for a Printer type 76 field in which the user can specify any printer or a specific printer 28, 30, 31 or 32 to print the Document 1. If the user selects a specific printer 28, 30, 31 or 39, then the InfoPrint Submit software 10 modifies the range of print attribute values available in pages 70a, b, c, d, e to include only those print attribute values supported by the selected printer 28, 30, 31 or 32. FIG. 5b shows a drop down menu for a Papcr type 78 field in which the user may select a paper type. Table 5 provides a description of the attributes in a preferred embodiment of the Print attribute page 70b and the behavior of the attributes.

Figure 6A:
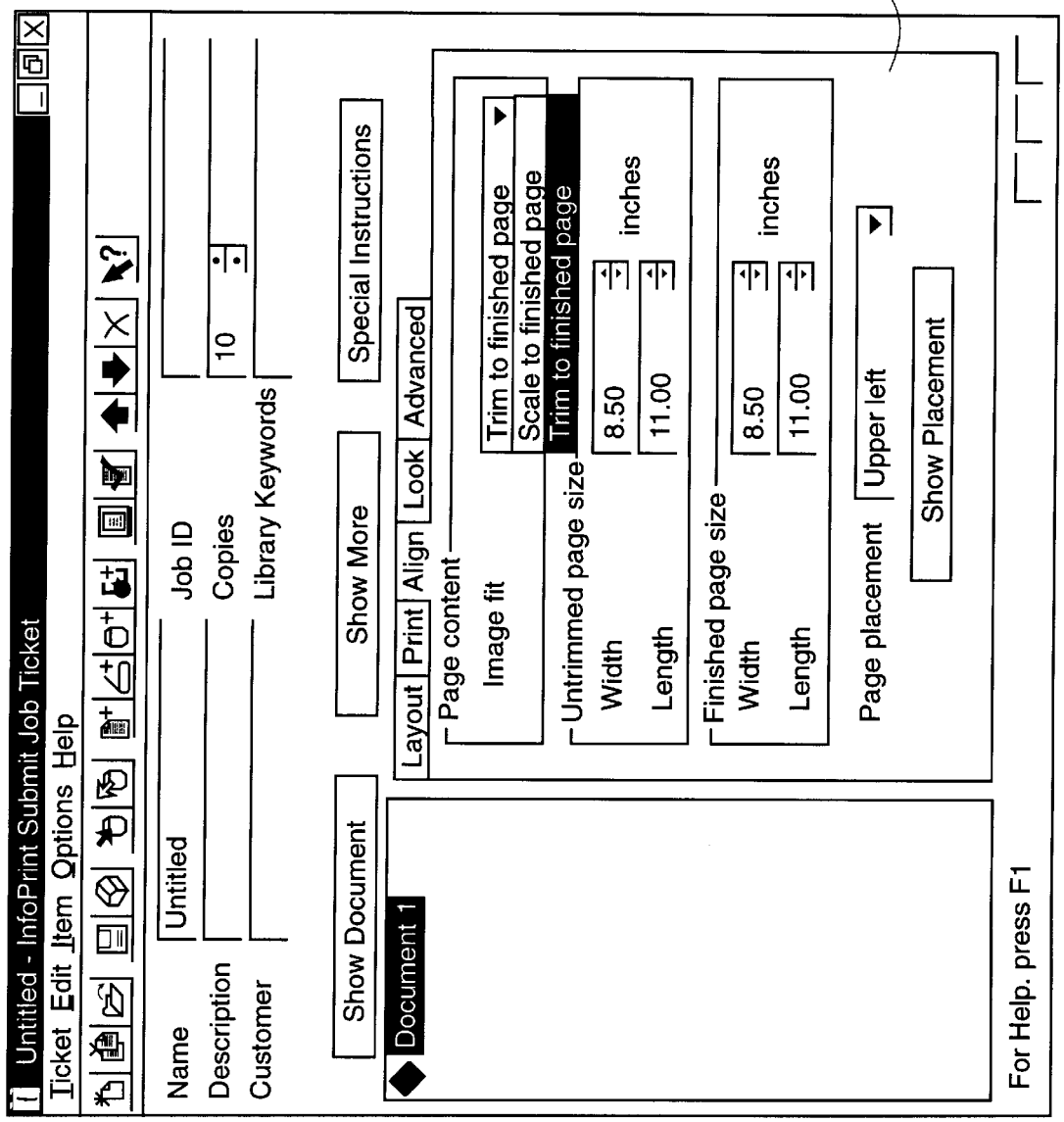
Figure 6B:
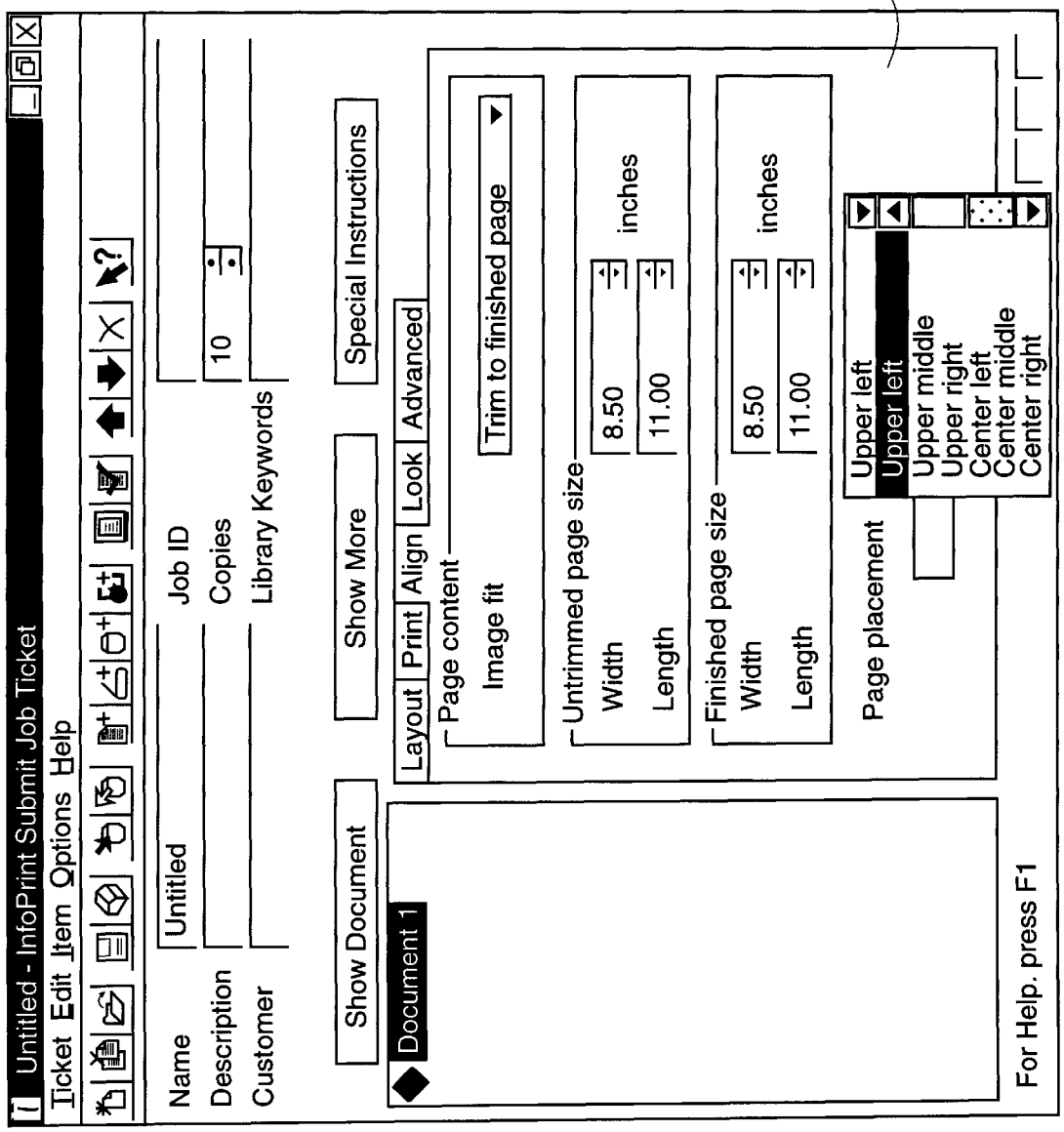
Figure 6C:
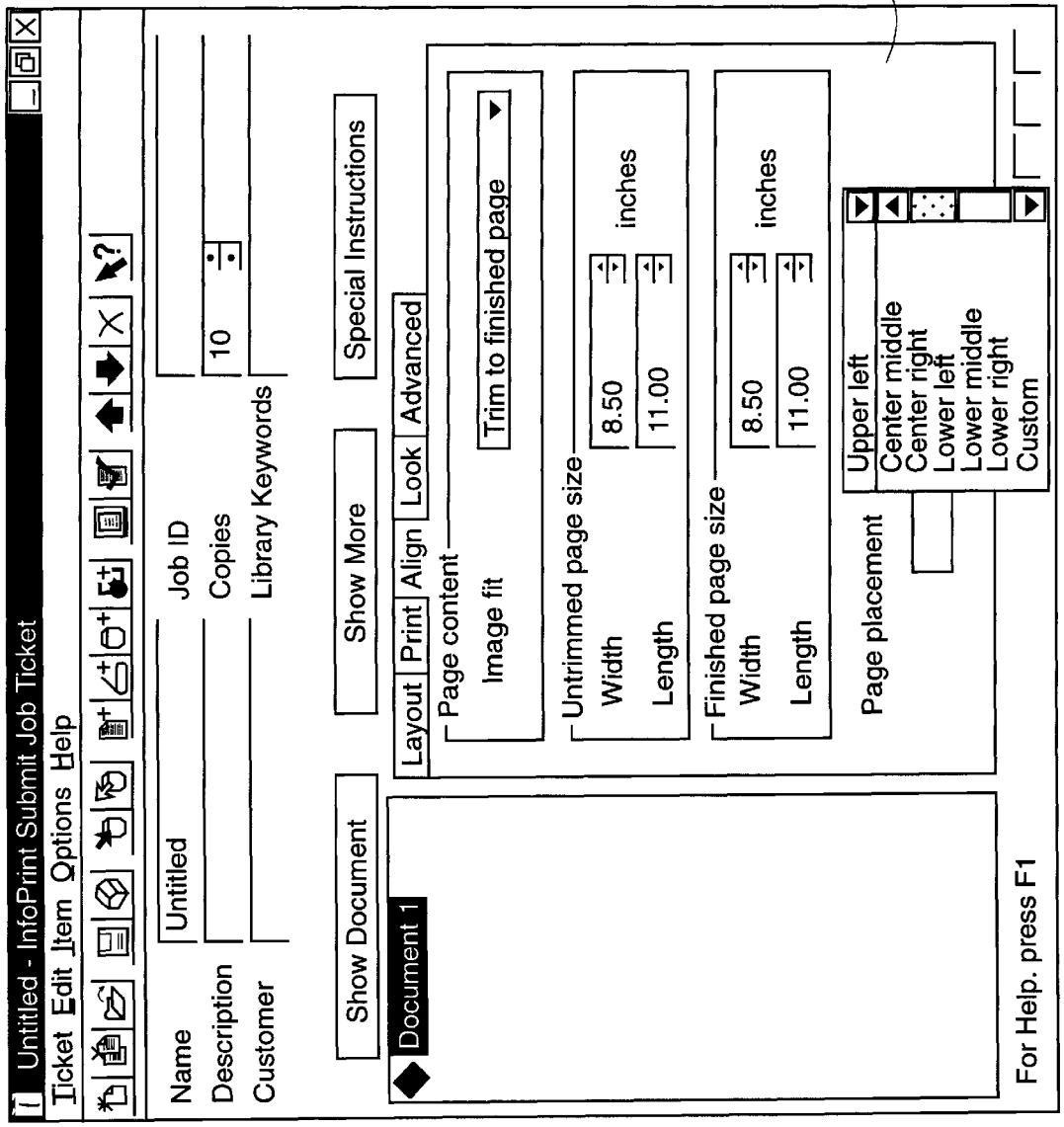

FIGS. 6a, 6b, and 6c illustrate the Align attribute page 70c, which allows the user to specify the orientation and placement of the of the page. Table 6 provides a description of the attributes in a preferred embodiment of the Align attribute page 70c and the behavior of the Align attributes.

Figure 7A:
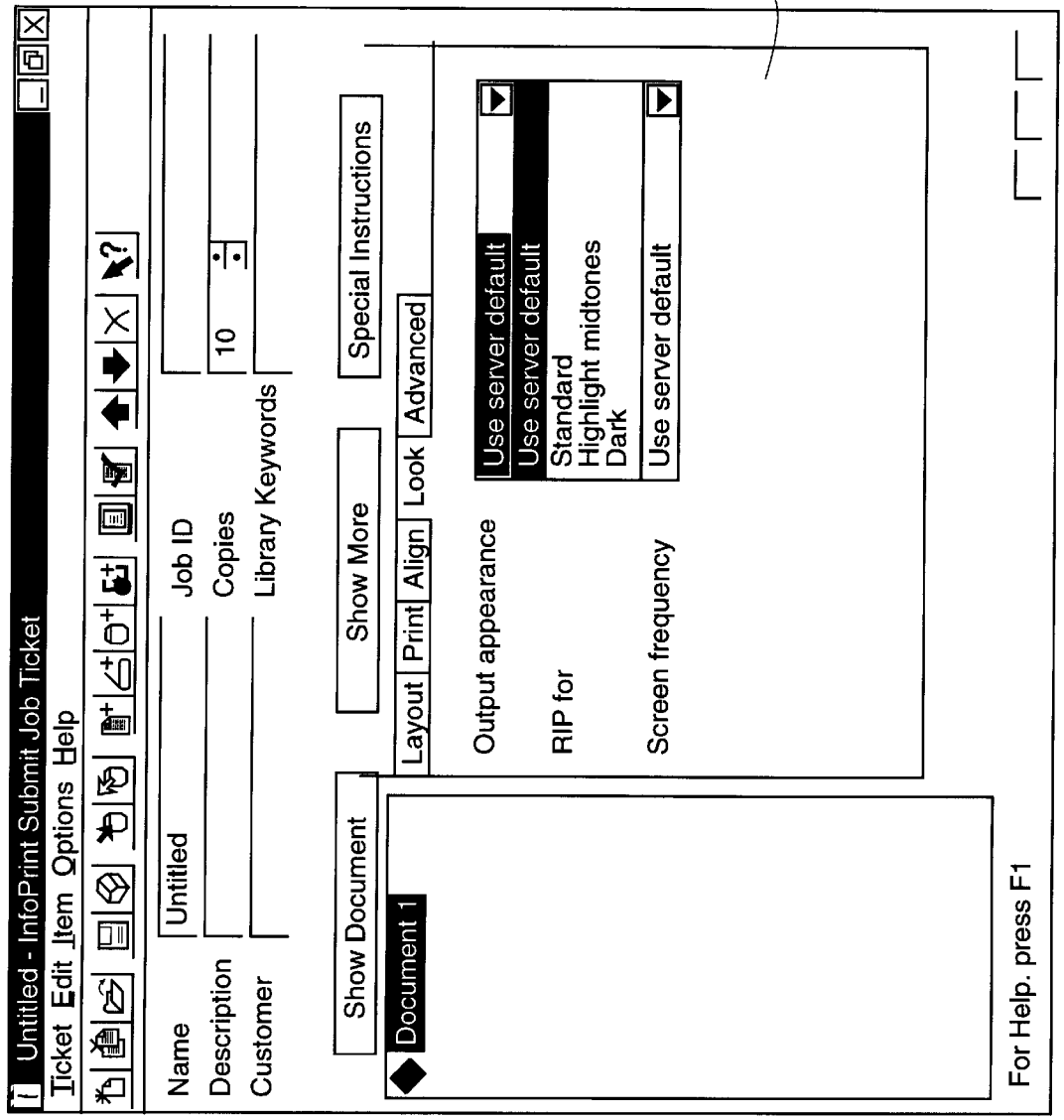
Figure 7E:
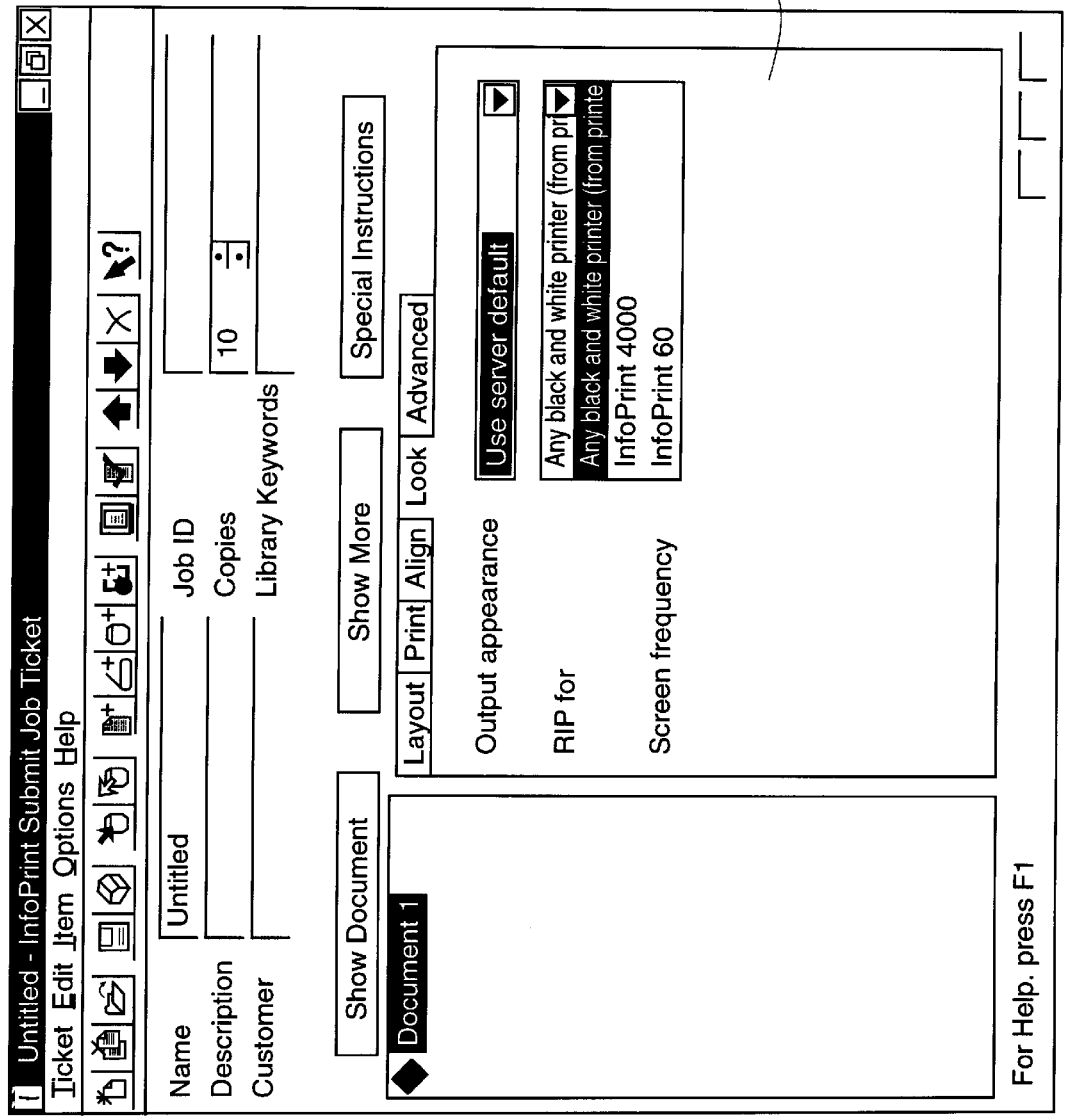

FIGS. 7a and 7b illustrate the Look attribute page 70d and accompanying drop down menus. The Look attribute page 70d includes fields in which the user can set the look of the printed output, e.g., standard, dark, etc., and identify the printer that will receive rasterized data. Table 7 provides a description of the attributes in a preferred embodiment of the Look attribute page 70d and the behavior of the Look attributes.

Figure 8:
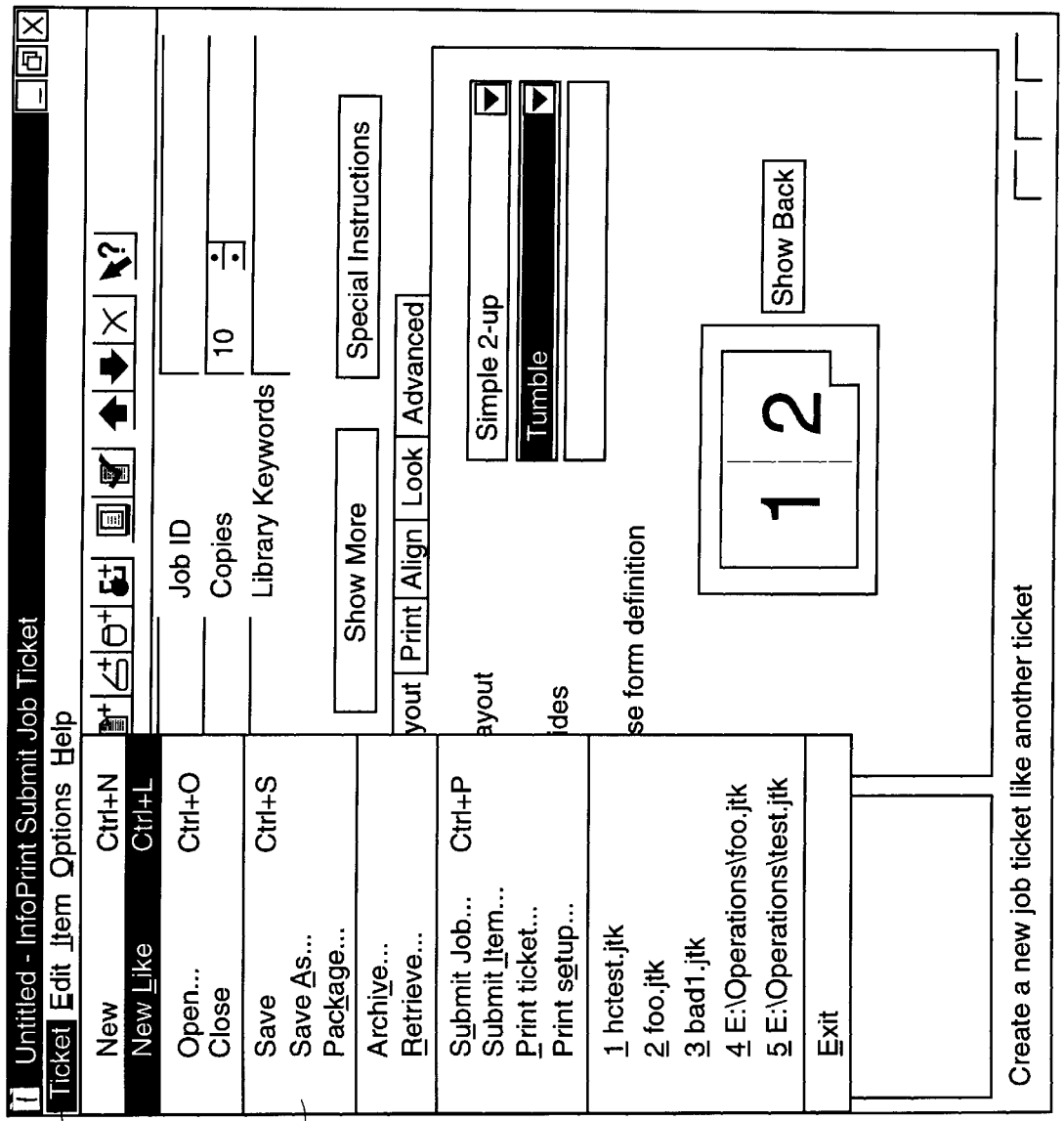

FIG. 8 shows a submenu 80 displayed when the user selects the Ticket item from the main menu item bar 62. The functions included in the submenus of the main menu items may be represented as an icon or alphanumeric string displayed in the GUI 60. The submenu 80 represents the functions as alphanumeric strings describing the function. The Ticket submenu 80 includes functions which allow the user to open a previously created job ticket (Open), create a new job ticket (New), save a job ticket the user has modified (Save or Save as), print the opened job ticket 40 (Print Ticket) or submit the job ticket to the InfoPrint MPC server 6 for printing (Submit Job). The Ticket submenu 80 further includes the Submit function which allows the user to enter the information for the print submission attribute record 56. The Submit function allows the user to select a File and Schedule pages into which the user may enter scheduling priority setting information for the job ticket 40. Tables 8 and 9 provide a description of a preferred embodiment of the fields and behavior of such fields in the File and Schedule pages.

Once the user creates a job ticket, the user may save the job ticket 40 or submit the job ticket 40 to the printing services manager 6 using the Save and Submit Job functions displayed in the Ticket submenu 80.

Figure 9:
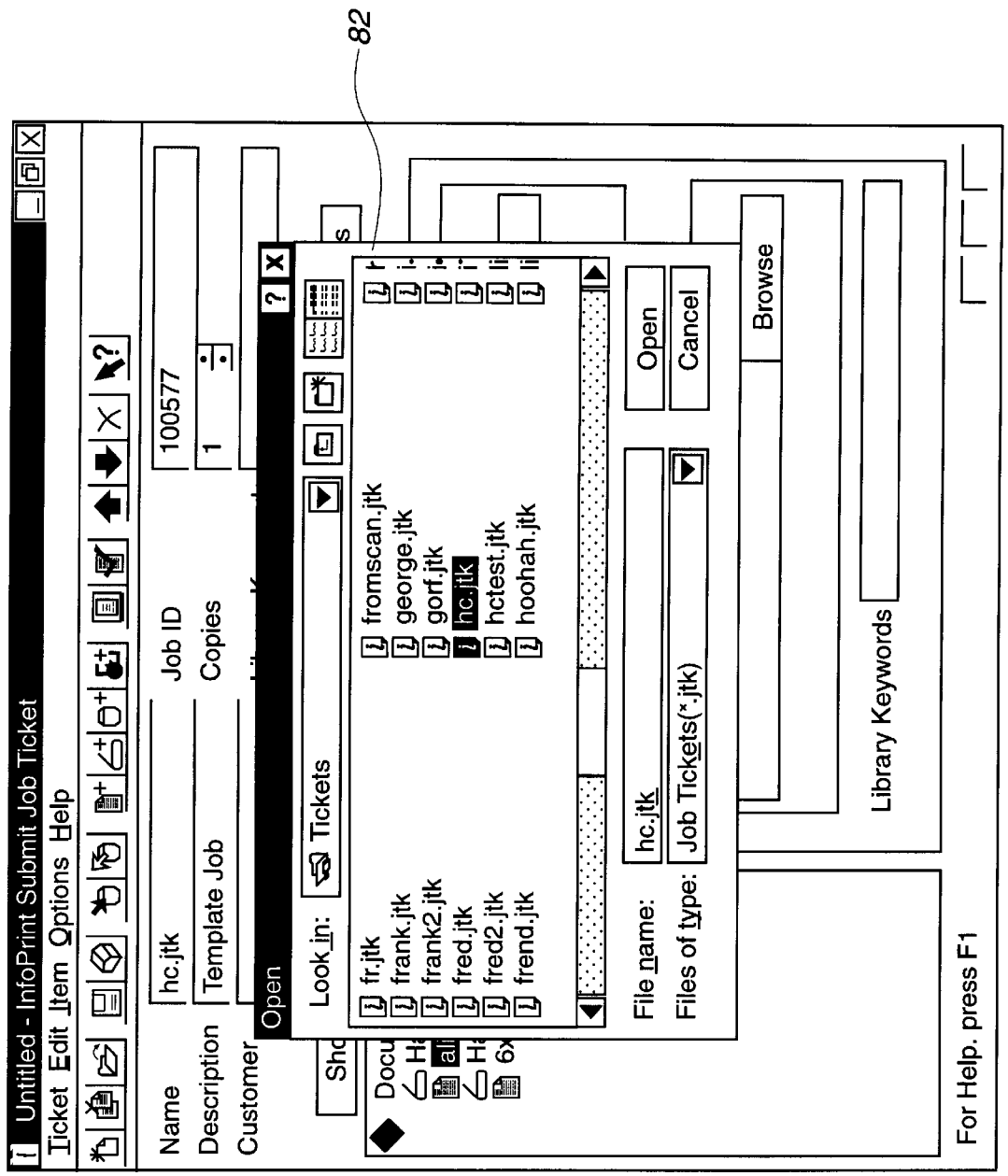

FIG. 9 shows an Open dialog box 82 that appears when the user selects the Open function from the Ticket submenu 80 (FIG. 8). The user may select and open one of the previously saved tickets displayed in the Open dialog box 82.

Figure 10:
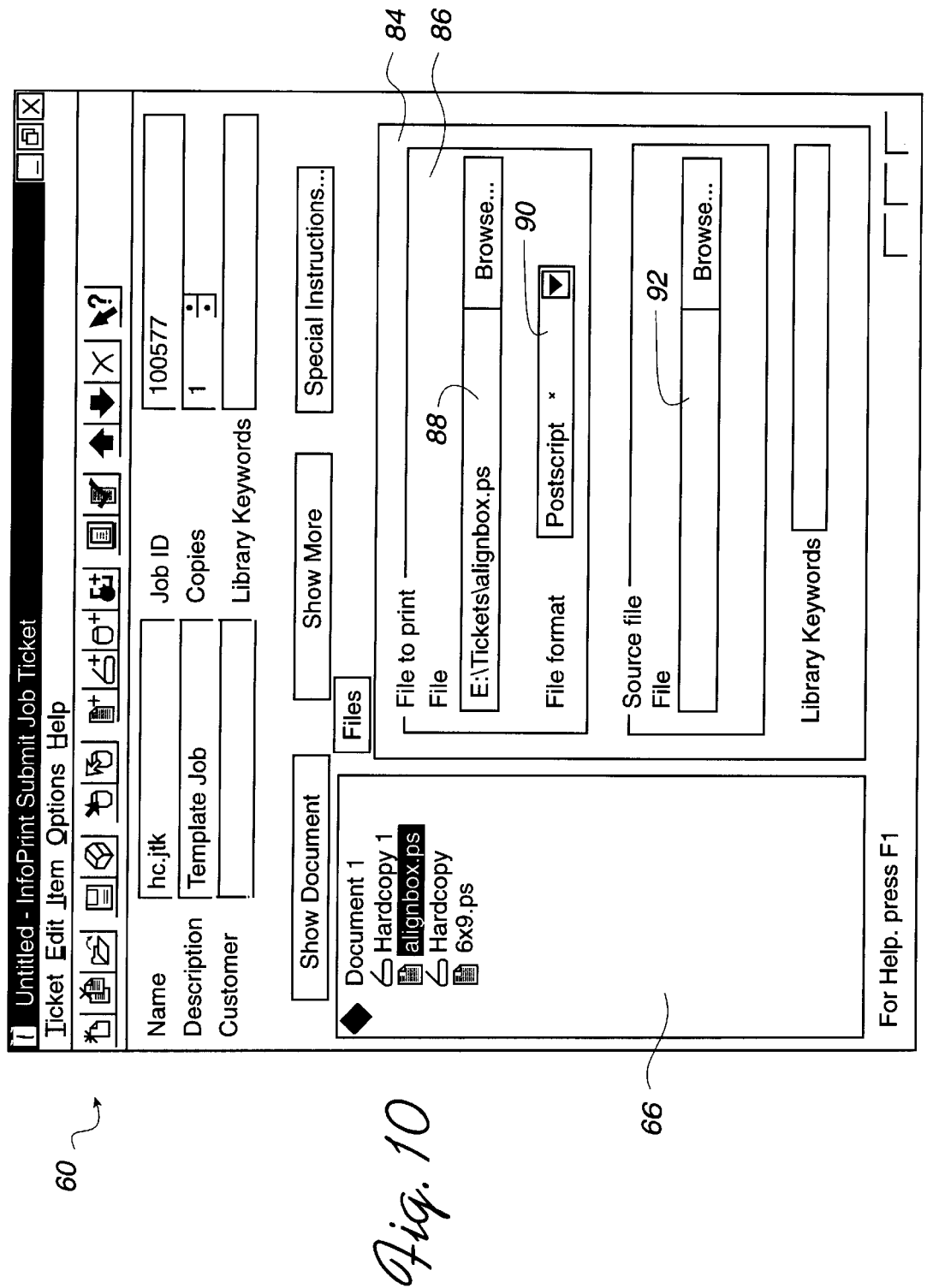

FIG. 10 shows the tree section 66 with two hardcopy items (Hardcopy 1 and Hardcopy 2) and two file items in PostScript format (alignbox.ps and 6×9.ps). The user may add, modify or delete elements from the tree section 66 using functions included in the Item and Edit main menu items. The Item submenu, shown in Table 1, includes functions which allow the user to add items, including files, hardcopies, library files, and variable data, and add documents. The user adds the hardcopy items using the Insert Hardcopy function and the PostScript file items using the Insert File function within the submenu of the Insert main menu item. The Edit submenu includes functions, shown in Table 1, which allow the user to modify the arrangement of the elements within the tree section 66, i.e., Move Up, Move Down, Remove, Delete.

FIG. 10 also shows a File attribute page 84 that appears when the user selects a particular file item with the mouse pointer. In FIG. 10, the user has selected the alignbox.ps file item. The file attribute page 84 allows the user to add information to the job ticket 40 on the location of the file item alignbox.ps and a source file from which the file item was generated. A file to print area 86 includes a File field 88 in which the user enters the location of the file item selected in the tree section 66, which in FIG. 8 is the directory path for the file "alignbox.ps." The user may enter the file location with a keyboard attached to the client computer 4a, b, c or the Browse radio button in the File to Print 84 area. The Browse radio button invokes a file manager GUI, such as is provided with the Microsoft Windows File Manager or Explorer programs. A file format field 90 indicates the format of the file item. This file format may be sniffed from the file name in the File field 88 or entered by the user. A source file field 92 provides the location of the original file from which the file item was generated. The user may enter the directory path for the source file in the source file field 84 using the keyboard or the Browse radio button.

Using the preferred embodiment of the present invention discussed above, the user may create a job ticket including documents and items, and set print attributes for the documents and items by selecting options in the print attribute pages 70a, b, c, d, e. As discussed, any setting at the document level within the tree section 66 applies to lower level items that branch from the document. There are primarily three ways to change the print attribute values available in the print attribute pages 70a, b, c, d, e. First, as discussed above, when a user selects a printer 28, 30, 31 or 32, the print attribute values reset to the values supported by the selected printer 28, 30, 31 or 32. Second, the InfoPrint Submit software 10 may occasionally query the InfoPrint MPC server 6 to obtain information on all the installed printers and printing options available. The InfoPrint Submit software would then modify the range of attribute values the user may select based on the information received from the InfoPrint MPC server 6 during the query. This process of querying the InfoPrint MPC server 6 to update printing options available on the client computer 4a, b, c is described in detail in the co-pending and commonly-assigned Application Ser. No. 08/932,066, filed on same date herewith, by Deborah Elisabeth Neuliard, Robert Curt Nielsen, Dwight Ross Palmer, and Luana Vigil, entitled "Method For Customizing Print Attribute Choices Based On Selected Model, Media, And Printer," attorney's docket number AM9-97-102, which application was incorporated by reference above. Still further, the InfoPrint Submit software includes the feature of allowing attribute fields to be added, deleted or modified in the print attribute pages 140. Third, the user may modify, delete, and add print attribute fields to the print attribute pages 70a, b, c, d, e.

In the preferred embodiment of the GUI 60 as set forth in Tables 1–9, the GUI 60 does not include a function to create the part record 48, 50 discussed above. Users can only create document records 44, 50 and item records 52, 54. However, in alternative embodiments, the job ticket 40 could include part elements. In such case, one of the submenus for the main menu items would include a function for adding parts records to the job ticket 40, such as the parts 48, 50 discussed above with respect to the job ticket 40 embodiment of FIG. 2. Alternatively, a submenu may include a function for grouping items into a named part. Associated with each part record 48, 50 would be print attribute pages 70a, b, c, d, e which would include fields for the user to enter print attribute information for the part records 48, 50. As discussed, any print attribute information entered for the part records would apply to any item records grouped in the part record.

Operational Flowcharts

Figure 11:
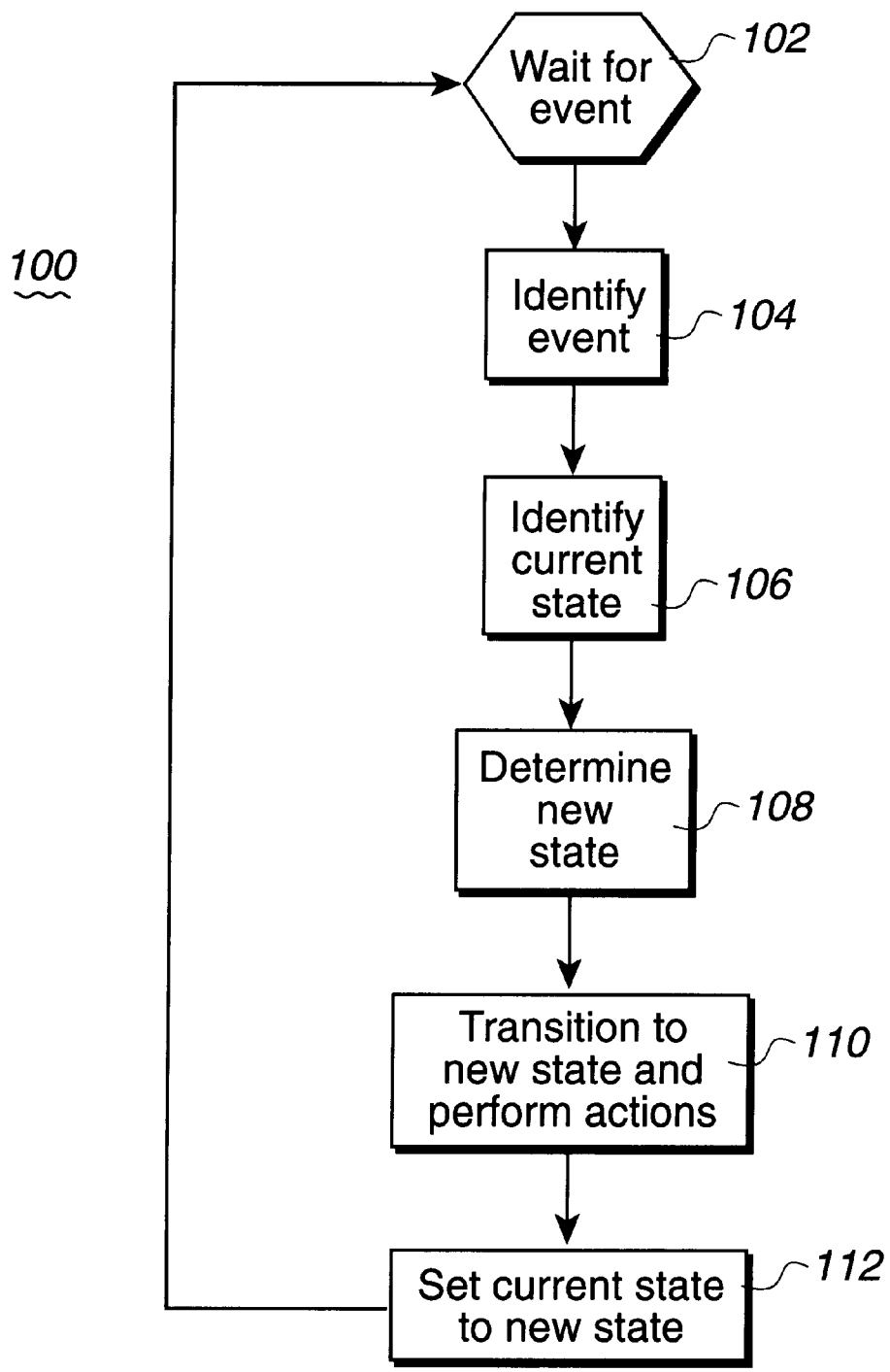
FIG. 11 is a flowchart that illustrates the general logic of a message or event-driven operating system and application program performing the steps of the present invention.

FIG. 11 is a flowchart that illustrates the general logic of the InfoPrint Submit software 10 according to the present invention. The InfoPrint Submit software 10 is event or message drive software, wherein operations are performed when transitions are made, based upon the receipt of messages or events, from present or current states to new states.

The general logic 100 begins by waiting at block 102 for an event (e.g., a mouse button click). It should be appreciated that during this time, other operating system tasks, e.g., file, memory, and video tasks, etc., may also be carried out. When an event occurs, control passes to block 104 to identify the event. Based upon the event, as well as the current state of the client computer 4a, b, c determined in block 106, a new state is determined in block 108. In block 110, the routine 60 transitions to the new state and performs any actions required for the transition. In block 112, the current state is set to the previously determined new state, and control returns to block 102 to wait for more input events.

The specific operations that are performed by block 100 when transitioning between states will vary depending upon the current state and the event. The various operations required to implement and maintain the present invention represent particular events handled by routine 100. 1lowever, it should be appreciated that these operations represent merely a subset of all of the events handled by any applications program or operating system.

Figure 12:
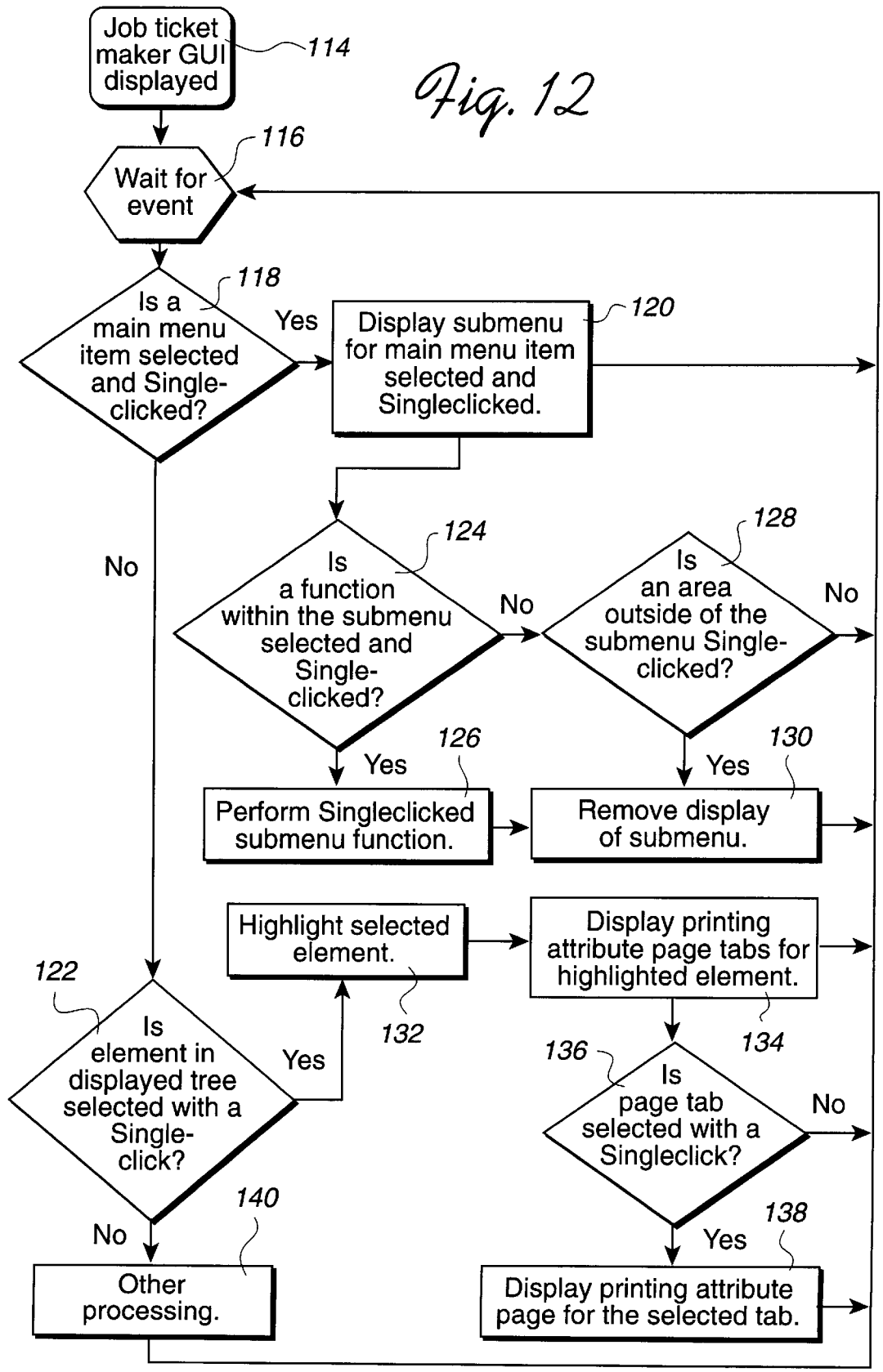
FIG. 12 is a flowchart that illustrates the general logic for a preferred embodiment of a routine performing the steps of the present invention.

FIG. 12 is a flowchart that illustrates more specific logic performed by the InfoPrint Submit software 10 when the GUI 60 is displayed as indicated at 114. The logic begins by waiting at block 116 for an event (e.g., a mouse button click signifying selection of a menu item). When an event occurs, control passes to blocks 118–139 to identify the events and perform associated functions.

Block 118 is a decision block that represents the client computer 4a, b, c determining whether a main menu item displayed on a main menu item bar 62 (FIG. 3) was selected and SingleClicked. If so, control transfers to Block 129;

otherwise control transfers to block 122. Block 120 represents the client computer 4a, b, c displaying in the GUI 60 a submenu for the selected main menu item. From block 120, control transfers to block 124, which is a decision block that represents the client computer 4a, b, c determining whether a displayed function within the submenu was selected. If so, control transfers to block 126; otherwise control transfers to block 128. Block 126 represents the client computer 4a, b, c performing the selected submenu function. After performing the selected submenu function, control transfers to block 130, which represents the client computer 4a, b, c removing the display of the submenu. Block 128 is a decision block that represents the client computer 4a, b, c determining whether the user Single-Clicked on an area of the GUI 60 outside of the displayed submenu. If so, control transfers to block 130, which represents the client computer 4a, b, c removing the display of the submenu; otherwise control transfers back to block 116.

Block 122 is a decision block that represents the client computer 4a, b, c determining whether an element (document, part or item) displayed in a tree section 66 of the GUI 60 (FIG. 3) is selected with a SingleClick. If so, control transfers to block 132; otherwise control transfers to block 139. Block 132 represents the client computer 4a, b, c highlighting the selected element to indicate its selection. From block 132, control transfers to block 134, which represents the client computer 4a, b, c displaying print attribute page tabs 68a, b, c, d, e (FIG. 3) associated with the element highlighted at block 132. From block 134, control transfers to block 136, which is a decision block that represents the client computer 4a, b, c determining whether a print attribute page tab 68a, b, c, d, e was selected. If so, control transfers to block 138; otherwise control transfers back to block 116. Block 138 represents the client 4a, b, c displaying a print attribute page for the selected print attribute page tab 68a, b, c, d, e, which in the case of FIG. 3 is the Advanced print attribute page 70e. Block 139 represents the client computer 4a, b, c performing other processing.

The various functions associated with a SingleClick event are determined by the current state of the InfoPrint Submit software 10. In many instances, the current state is represented visually on the monitor connected to the client computer 4a, b, c.

It should be appreciated that there are a large number of states, events and operations that are associated with the InfoIlrint Submit software 10. Generally, these various operations performed by the InfoPrint Submit software 10 can be classified within certain categories:

while in any mode, selecting a main menu item from the main menu item bar 62 to display a submenu of functions;

after selecting an element (document, part or item) within the tree section 66 of the GUI 60, selecting the Item or Edit main menu items to modify or edit the tree structure arrangement of elements;

after selecting an clement within the tree section of the GUI 60, selecting a print attribute page tab 68a, b, c, d, e for the selected element; or after selecting a print attribute page tab 70a, b, c, d, e, entering print attribute information on the displayed print attribute page 70a, b, c, d, e.

In preferred embodiments, the various operations described above are specifically related to the InfoPrint Submit software 10. Of course, those skilled in the art will recognize that the use of the present invention with computer programs may result in different operations (or potentially the same operations).

Also in the preferTed embodiment, the identifier Single-Click is intended to indicate a default single click action, which uses the left mouse button. Other mouse buttons are indicated through the use of appended identifiers, such as (RightMouseButton), etc.

Of course, those skilled in the art will recognize that the use of any mouse button, keyboard sequence, voice command, or other user input is merely a design choice, and the functions performed by the present invention could be invoked by any number of different combinations of mouse buttons, keyboard sequences, voice command, or any other user input.

Interfacing with Other Products

Figure 13A:
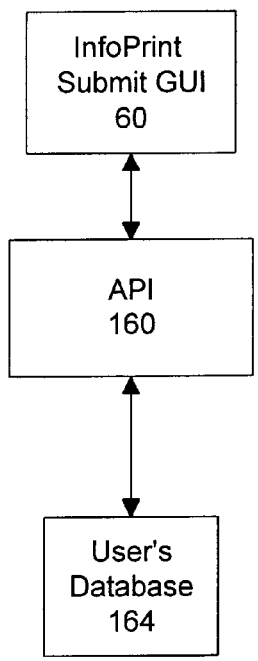
FIG. 13 is a block diagram is illustrating a preferred embodiment for interfacing the present invention with databases of files in varying formats.
Figure 13B:
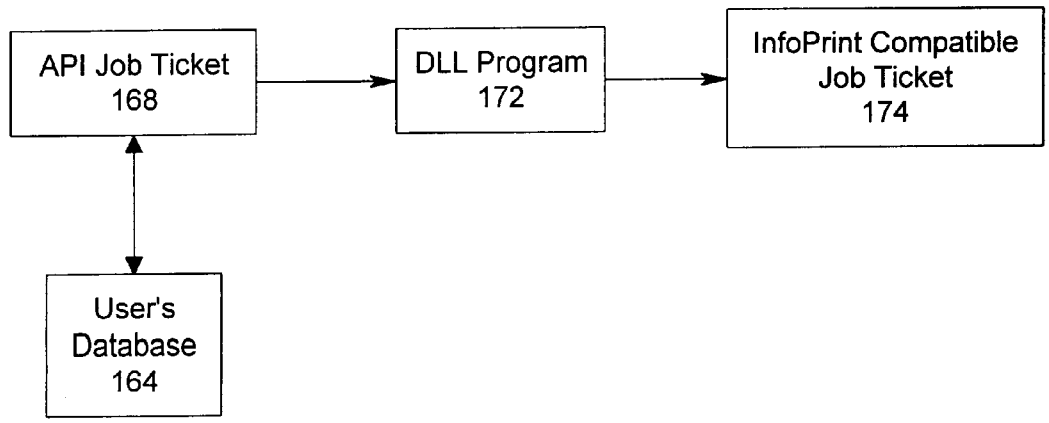

In certain cases, the user may have a database of print image files, print jobs, job tickets, and other data. The format, including print attribute format, of the files stored in the user's database may not be compatible with the format of files created with the InfoPrint Submit software 10. In such case, an application program interface (API) can be used to interface between the InfoPrint Submit software 10 and the user's database. FIGS. 13a and 13b illustrate how an API may interface between the InfoPrint Submit software 10 and the user's database. FIG. 13a shows an API 160 handling requests between the GUI 60 included in the InfoPrint Submit software 10 and a user's database 164 which stores data in a format that is not compatible with the InfoPrint Submit software 10. In the embodiment of FIG. 13a, the user may build a job ticket using the GUI 60. Whenever a user requests data from the user's database 164 through the GUI 60, the API interface 160 will provide linkage for the call. The API interface 160 will convert the files in the user's database 164 to a format compatible with the GUI 60.

FIG. 13b shows an alternative use of the API with the present invention. In FIG. 13b, the API program is used to build an API job ticket 168 which is compatible with the files stored in the user's database 164. The format the API job ticket 168 provides for storing print attribute information is different from the job ticket created with the InfoPrint Submit software 10 GUI 60. When the InfoPrint Submit software 10 attempts to process the API job ticket 168, a dynamic link library (DLL) program 172 is called to convert the API job ticket 168 into a job ticket 174 that is compatible with the InfoPrint Submit software 10. The process of FIG. 13b could work with any job ticket or job processing format incompatible with the InfoPrint Submit software.

Conclusion

This concludes the description of the preferred embodiments of the invention. The following describes some alternative embodiments for accomplishing the present invention.

For example, the client computer 4a, b, c and InfoPrint MPC server 6 may be any type of computer, such as a mainframe, minicomputer, work station, personal computer or combinations thereof operating under any suitable operating system. In addition, the client computer 4a, b, c may include any software program, application or operating system having a graphical user interface and performing the operations of the present invention. Still further, some or all of the functions described above as being performed by the client computer 4a, b, c could, in alternative embodiments, be performed by the InfoPrint MPC server 6, and vice versa.

Those skilled in the art will also recognize that the GUI and data structure may be modified to accommodate different types of print attributes other than those described above. Still further, the GUI may have a different appearance, layout and design then the GUI described above.

Still further, those skilled in the art will recognize that in the flowcharts set forth in FIGS. 11 and 12, programming steps may be added, modified, deleted or performed in an order different than the order set forth in the preferred embodiments.

In summary, the present invention discloses a method, apparatus, and program for creating a job ticket on a computer, wherein the job ticket includes information on components and print attributes of a print job. The created job ticket includes an identification record including information identifying the job ticket, a document record including information on a document included in the print job and print attributes for the document, and an item record including information on an item that is a component of the document and print attributes for the item. The job ticket may further include a record including information on scheduling options for the print job. The item record is arranged in a lower hierarchical relationship to the document record such that the print attributes for the document apply to the item. After creating the job ticket, the present invention processes the job ticket and, then. transmits the processed job ticket to a printer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

TABLE 1

SUBMENUS OF MAIN MENU ITEMS

| Ticket | Edit | Item | Options | Help |
|---|---|---|---|---|
| New . . . | Undo | Insert File . . . | Print Job Status . . . | Contents |
| New Like . . . | — | Insert Hardcopy | — | About . . . |
| Open . . . | Cut | Insert Library file . . . | Refresh Lists | |
| — | Copy | Insert Variable Data . . . | — | |
| Save | Paste | — | Setup . . . | |
| Save As . . . | — | View | Preferences . . . | |
| Package . . . | Move Up | Preflight | Papers . . . | |
| — | Move Down | — | | |
| Archive . . . | Rename | Add Document | | |
| Retrieve . . . | Remove | | | |
| — | Delete | | | |
| Submit Job . . . | | | | |
| Print Ticket . . . | | | | |
| Printer Setup . . . | | | | |
| — | | | | |
| previous job tickets | | | | |
| — | | | | |
| Exit | | | | |

TABLE 2

DESCRIPTION AND BEHAVIOR
OF MAIN MENU ITEM FUNCTIONS

| Menu | Item | Available | Behavior |
|---|---|---|---|
| Ticket | New | Always | Clears all fields in the window including the general attributes and the tree view. Changes Name field to Untitled and marks (selects) it. |
| | New Like . . . | Always | Opens the standard Open dialog. Set Files of type field to Job Ticket Files. When a job ticket is selected, it is opened with the Name field set to Untitled (and marked) and the Job ID field cleared. |
| | Open . . . | Always | Opens the standard Open dialog. Set Files of type field to Job Ticket Files. If file name does not match the job name, change the value of the job name. |
| | Save | Always | Saves the current job ticket. If the job has not been saved before, open the standard Save As directory. Show the directory specified in Preferences as the default directory. Set the file name to the job name. If it is saved as a different name, change the job name in the ticket to match the new name. If the name is a duplicate name, open the standard Do You want to Replace? Dialog. |
| | Save as . . . | Always | Opens the standard Save As dialog. The Save as type field defaults to job ticket type. If this ticket has not been saved before, default the directory to the directory specified in Preferences. The directory for changes based on the Save as type and the directories specified in Preferences. Set the file name to the job name. If it is saved as a different name, change the job name in the ticket to match the new name. If the name is a duplicate name, open the standard Do You want to Replace? Dialog. |

TABLE 2-continued

DESCRIPTION AND BEHAVIOR
OF MAIN MENU ITEM FUNCTIONS

| Menu | Item | Available | Behavior |
|---|---|---|---|
| | Package . . . | Always | Open Select Directory dialog (Alex's). The job ticket, and all the files associated with this job ticket are saved in the directory. If any files reside in the Library, they are copied to this directory. If any files have .pdf or .rip associated with them, they are copied to this directory. |
| | Archive . . . | Job is saved and Library is installed | Packages the job ticket and its files and archives the job. If the job is displayed in the status window, update the status. |
| | Retrieve . . . | Job is saved and Library is installed | Opens the Logon dialog if this is the first invocation of Library. Then opens the Retrieve Ticket dialog. When the ticket is selected from the Library, a new job ticket is created. The Name is set to. Untitled (and marked), the Job ID is cleared, and the tree is filled with references to the Library shared directory. |
| | Submit Job . . . | Always | Opens the Submit dialog. If there are no items in the tree, put up a message. |
| | Print Ticket . . . | Always | Opens the standard Print dialog. Prints the formatted job ticket. |
| | Printer Setup . . . | Always | Opens the standard Print Setup dialog. |
| | previous job tickets | Always | Lists the previous X job ticket file names where X is specified in the Preferences Dialog. |
| | Exit | Always | Closes the job ticket window. If the current job ticket file has changed from the last time it was saved, prompt the user to save the file. |
| Edit | Undo | After a cut or a paste. | Undoes cut or paste. |
| | Cut | Always | Cuts the selected item, part or document to the clipboard. |
| | Copy | Always | Copies the selected item, part or document to the clipboard. |
| | Paste | After a Cut or Copy | Pastes the item to the current position in the tree. |
| | Move up | Item, Part or Document is selected and item is not the first item | Moves the selected item before the previous item that's at the same level. |
| | Move down | Item, Part of Document is selected and item is not the last item | Moves the selected item after the next item that's at the same level. |
| | Rename | Always | Puts the standard edit box around the selected item in the tree. If the item is a file, the file to print is not renamed, just the item in the tree. If the file is a Library Reference, the file to print is not renamed, just the item in the tree. |
| | Remove | Always | Removes the selected item from the tree. If the only document is selected, removes all the items for that document, but leaves the document in the tree. |
| | Delete | Only disabled when a Library Reference is selected. | Opens a prompt confirming deletion of the item.<br>• Document - Prompt for all items in document. All items and document will be deleted. If this is the only document in the tree, the items will be deleted, but the Document level will still be in the tree/ticket. Delete associated files (RIP files and PDF files)<br>• File - Prompt for the file. The file will be deleted and removed from the tree/ticket Delete associated files (RIP files and PDF files)<br>• Library Reference - Can't do it.<br>• Variable Data - Prompt for all files relating to this item. The files will be deleted and the item will be deleted from the ticket/tree. Delete associated files (RIP files and PDF files)<br>• Hardcopy - Prompt for all 10 files relating to this item. The files will be deleted and the item will be deleted from the ticket/tree. Delete associated saved RIP files. |
| Item | Insert file . . . | Always | Opens the standard open dialog listing the allowed filetypes (see sniffed file types). Replace Open button with Insert button. After file is selected, the new file item is added to the Tree View following the currently selected item. The item displays the fully qualified file name and the File attribute pages are shown. |
| | Insert hardcopy | Always | The item Hardcopy X is added to the Tree View following the current item and the hardcopy attribute pages are shown. X starts at 1 and increments for every |

TABLE 2-continued

DESCRIPTION AND BEHAVIOR OF MAIN MENU ITEM FUNCTIONS

| Menu | Item | Available | Behavior |
|---|---|---|---|
| | | | hardcopy item in the job. |
| | Insert library file . . . | Library is installed | Opens the Library Logon dialog (only the first time). If the file is saved, the fully qualified file name is added the Tree view following the current item. If the file is referenced, the Tree view is updated with the filename. The file attribute pages are shown. |
| | Insert variable data | Disable after one variable data item is added to the tree (there can only be 1 variable data item in a ticket). | The item Variable Data X is added to the Tree view following the current item and the variable data attribute pages are shown. X starts at 1 and increments for every variable data item in the job. |
| | Preflight | When selected file is a PostScript file | Opens Preflight Dialog. |
| | View | Always | Opens the viewer for the selected item as specified in the Preferences dialog. If this is a PostScript file, and a PDF does not already exist, open the Preflight dialog. |
| | Add document | Always | Adds a Document X following the current document. If no items are selected, the item is added to the bottom of the list. X starts at 1 and increments for every document in the job. |
| Options | Print job status . . . | Always | Opens the Print Job Status dialog. |
| | Refresh lists | Always | Queries for Logical printers and for Papers. Refreshes those drop down lists. |
| | Setup . . . | Always | Opens the Setup dialog. |
| | Preferences . . . | Always | Opens the Preferences dialog. |
| | Papers . . . | Always | Opens the Papers dialog. |
| Help | Contents | Always | Opens WinHelp to the Contents page. For Mac, it opens Netscape with the contents of the page loaded. |
| | About . . . | Always | Opens the About box. |

TABLE 3

| Selected Tree Item | Attribute Pages Shown |
|---|---|
| Document | Layout |
| | Print |
| | Align |
| | Look |
| | Advanced |
| File | File* |
| | Print |
| | Align |
| | Look |
| | Advanced |
| Library Reference | File* |
| | Print |
| | Align |
| | Look |
| | Advanced |
| Hardcopy | Scan Files* |
| | Hardcopy* |
| | Print |
| | Align |
| | Look |
| | Advanced |
| Variable Data | Variable Data* |
| | Referenced Files* |
| | Print |
| | Align |
| | Look |
| | Advanced |

TABLE 4

DESCRIPTION OF ATTRIBUTES IN THE LAYOUT ATTRIBUTES PAGE AND BEHAVIOR OF ATTRIBUTES

DESCRIPTION OF THE LAYOUT ATTRIBUTES

| pd attribute | Label | Control | Values | Operations Default |
|---|---|---|---|---|
| sides, plex | Sides | drop down list | Simplex, Duplex, Tumble, Use server default | Duplex |
| output-format | Layout | drop down list | Side by side copies, Slit and merge, Booklet, No adjustment, Use server default | Side by side copies |

TABLE 4-continued

DESCRIPTION OF ATTRIBUTES IN THE LAYOUT ATTRIBUTES PAGE AND BEHAVIOR OF ATTRIBUTES

| | | | | |
|---|---|---|---|---|
| number-up | Number up | drop down list | 1, 2, 3, 4, Use server default | 2 |
| form-definition | Use form definition | check box with entry field following label | 8 alphabetic characters | unchecked |
| | Calculate number of pages | check box | | checked at document level. |
| job-page-count | Number of pages | entry field with spin box | 0-999999 | For an item, blank For a Document, totaled from items when box is checked. |

BEHAVIOR OF THE LAYOUT ATTRIBUTES

| Label | Available | Behavior |
|---|---|---|
| Sides | Disable when Booklet (set to duplex) and disable when Form Def specified | simplex: set sides = 1 plex = simplex<br>duplex: set sides = 2 plex = simplex<br>tumble: set sides = 2 plex = tumble<br>Use server default: do not send sides or plex<br>Updates bitmap |
| Layout | Always | Updates bitmap<br>Disable Number up when Slit and merge or No Adjustments.<br>Set Sides to Duplex and disable Sides when Booklet. |
| Number up | Disable when Layout is Slit and merge or No Adjustment or Use server default<br>Disable when Use Form Definition is checked | Updates bitmap |
| Use form definition | Disabled on item level.<br>At Document level, disabled for IC 70. | When a file is not specified, the file defaults to what is specified in the IVD. This file resides on the server. Disables the following:<br>Sides, at an item level<br>Layout choices Side by side copies and Booklet<br>Number up<br>Paper, at an item level<br>Rotation<br>Align page |
| Calculate number of pages | Disabled at item level | If this box is checked, at the document level total the number of pages for each item. |
| Number of pages | Disabled at item level | job-page-count is only set at the document level. |

TABLE 5

DESCRIPTION OF ATTRIBUTES IN PRINT ATTRIBUTES PAGE AND BEHAVIOR OF ATTRIBUTES

DESCRIPTION OF PRINT ATTRIBUTES

| pd attribute | Label | Control | Values | Default |
|---|---|---|---|---|
| printer-models-requested | Printer type | drop down list | InfoPrint 4000<br>InfoPrint 60<br>Any black and white<br>InfoColor 70 | InfoPrint 4000 |
| default-printer-resolution | | | | 600 |
| default-medium<br>default-input-tray | Paper | drop down list | list from query of supported media, list of checked trays in Preferences, Use server default | first in list |
| start-on-new-sheet | Start on a front facing page | check box | | unchecked |
| transform-output-file-name | Save RIPed file | checkbox | | unchecked |

BEHAVIOR OF PRINT ATTRIBUTES

| Label | Available | Behavior |
|---|---|---|
| Printer type | Read-only at item level | IP 4000 - sets Calibrate for field on Look page. Disables the following:<br>Tray paper choices.<br>No adjustment Layout choice. |

TABLE 5-continued

DESCRIPTION OF ATTRIBUTES IN PRINT ATTRIBUTES PAGE AND BEHAVIOR OF ATTRIBUTES

| | | |
|---|---|---|
| | | Paper, at an item level |
| | | IP 60 - Sets Calibrate for field on Look page. Disables the following: |
| | | Slit and merge Layout choice. |
| | | Insert Variable Data menu item. |
| | | Any B&W - Defaults Calibrate for field on Look page to Server default. |
| | | Disables the following: |
| | | Tray paper choices. |
| | | Slit and Merge and No adjustment choices for Layout choices. |
| | | Insert Variable Data menu item. |
| | | Paper, at an item level |
| | | IC 70 - Disables the following: |
| | | Tray paper choices |
| | | Paper, at an item level |
| | | Align page |
| | | Look page |
| | | Advanced page |
| | | Form definition field |
| | | Save RIPed file field |
| | | RIP Options in Print Submit |
| | | General Options in Print Submit |
| | | Use RIP button in Print Submit |
| | | Stacker in Print Submit |
| | | Separator Sheets in Print Submit |
| Paper | Disabled at item level when: Use Form Definition is checked on Layout page. IP 4000 or Any B&W | If a tray is specified, set default-input-tray and use appropriate paper size for Align page. Otherwise, set default-medium and use default untrimmed page size from the media object for Align page. |
| Start on front facing page | Always | |
| Save RIPed file | Disabled for IC 70 | If checked, set transform-output-file-name to the jobname in the directory specified in the job ticket. The directory is determined by the shared directory specified in the Setup dialog. |

TABLE 6

DESCRIPTION OF ATTRIBUTES IN THE ALIGN ATTRIBUTES PAGE AND BEHAVIOR OF ALIGN ATTRIBUTES

DESCRIPTION OF THE ALIGN ATTRIBUTES

| pd attribute | Label | Control | Values | Default |
|---|---|---|---|---|
| | Page Content | Groupbox with Rotation drop down and Trim and Scale radio buttons | | |
| content-orientation | Rotation | drop down list | None, 90° clockwise, 180°, 90° counterclockwise, Use server default | None |
| image-fit | Trim to unfinished page size | radio button | | on |
| | Scale to unfinished page size | radio button | | off |
| | Unfinished page size | Groupbox with Length and Width | | |
| | Length | spinbox | numbers | If Paper is a media-supported, get this information from the media object. If the object information is blank, use the default set in Preferences. |

TABLE 6-continued

DESCRIPTION OF ATTRIBUTES IN THE ALIGN
ATTRIBUTES PAGE AND BEHAVIOR OF ALIGN ATTRIBUTES

|  |  |  |  |  |
|---|---|---|---|---|
|  | Width<br>Finished page<br>size | Groupbox with Length,<br>Width |  | If this is a tray, use<br>the default set in<br>Preferences for the<br>selected tray. |
| image-length | Length | entry field with spin box | page size | default to un-<br>trimmed page size |
| image-width<br>x-image-shift<br>x-image-shift-back<br>y-image-shift<br>y-image-shift-back | Width<br>Page placement | drop downlist | Upper left, Upper<br>right, Upper middle,<br>Center left, Center<br>middle, Center right,<br>Lower left, Lower<br>middle, Lower right,<br>Other | Upper left |
|  | Show<br>placement | pushbutton |  |  |

BEHAVIOR OF THE ALIGN ATTRIBUTES

| Label | Available | Behavior |
|---|---|---|
| Rotation | Always* | Shows image rotated in Placement dialog. |
| Trim to unfinished page size | Always* | sets image-fit to id-val-image-fit-position-and-trim |
| Scale to unfinished page size | Always* | sets image-fit to id-val-image-fit-scale-to-fit |
| Unfinished page size | Always* | Use this value to determine the offsets and in the Placement dialog. Use the units that are specified in Preferences. |
| Finished page size | Always* | Use this value to determine the offsets and in the Placement dialog. Use the units that are specified in Preferences. |
| Page placement | Always* | Use this value to set the offsets displayed in the Placement dialog. This value is updated based on the Placement dialog.<br>Note: Other is used when additional shifting has been performed. |
| Show placement | Always* | Opens the Placement dialog. |

*Note: This tab is disabled when Printer type is IC 70 or when Use Form Definition is checked.

TABLE 7

DESCRIPTION OF ATTRIBUTES IN
LOOK ATTRIBUTES PAGE AND BEHAVIOR OF ATTRIBUTES

DESCRIPTION OF THE LOOK ATTRIBUTES

| pd attribute | Label | Control | Values | Default |
|---|---|---|---|---|
| output-<br>appearance | Output<br>appearance | drop down list | Use server default<br>Standard<br>Highlight midtones<br>Dark<br>Custom . . . | Use server default |
| base-printer | Calibrate for | drop down list | Use server default,<br>InfoPrint 4000, InfoPrint<br>60 | set to value of Printer<br>type. If Printer type is<br>Black and white, set to<br>server default and<br>disable. |
| screen-frequency | Screen frequency | drop down list | Use server default,<br>71,85,106 | Use server default |
| scanner-<br>correction | Scanner<br>correction | editable drop<br>down list | Use server default,<br>Xerox DocuImage 620S,<br>None | TIFF - Server<br>default<br>Hardcopy Item -<br>Server default<br>Otherwise - None |

BEHAVIOR OF THE LOOK ATTRIBUTES

| Label | Available | Behavior |
|---|---|---|
| Output appearance | Always* | When custom is selected, pop-up a prompt for the name of the custom output appearance file. When this window closes, put the value in this field. |

TABLE 7-continued

DESCRIPTION OF ATTRIBUTES IN LOOK ATTRIBUTES PAGE AND BEHAVIOR OF ATTRIBUTES

| | |
|---|---|
| Calibrate for | Disabled for Any B&W (and set to server default)* |
| Screen frequency | Always* |
| Scanner correction | Always* |

*NOTE: This page is not shown for the IC 70.

TABLE 8

FILES PAGE

Description:

| pd attribute | Label | Control | Values | Default |
|---|---|---|---|---|
| printer-name-requested | Printer | drop down list | displays all logical printer values that can submit jobs to the printer specified by Printer Type | first in the list |
| job-client-id | Print job ID | read-only field | job ID plus submit count(.00x). If the job ID is blank, use jobname. | same as value |
| results-profile job-copies | Copies to print | spin box increments by 10 | 1..99999 | number of copies specified in job ticket |
| optimize-for-multiple-copies | Proof | checkbox | | unchecked |
| job-page-count | Pages to print | spinbox | 1-999999 | total number of pages for checked items. |
| auxiliary-sheet-selection | Separator sheet | Group box with checkboxes for Start, Slipsheet and End | | Slipsheet checked |
| output-bin | Stacker | drop down list | Base, Side | Side |
| | Files to print | list box with 2 columns labeled Item, and File to Print. Each item in the item column has a checkbox. | Item column All items from the current document are listed. The selected item is checked. File to Print column include the file created date (for both RIP and Files: fully qualified filename or filename.rip when file has already been RIPed. Hardcopy: x TIF files or x RIPed files Library: fully qualified filename or filename.rip when file has already been RIPed. Variable data: name of document definition file or docdef.rip. | files in currently selected item are checked. |
| | Check all | pushbutton | | |
| | Uncheck all | pushbutton | | |
| | ReRIP all | pushbutton | | |
| | ReRIP selected | pushbutton includes checked | | |

Behavior

| Label | Available | Behavior |
|---|---|---|
| Printer | Always | Displays all logical printers that submit jobs to printers of the specified type. When the printer type is All Black and White printers, list all logical printers that send jobs to the IP 60 or the IP 4000. |
| Print job ID | read-only | The submit count starts at .001 for a new or new like job and |

TABLE 8-continued

FILES PAGE

| | | |
|---|---|---|
| | | is incremented for every submission of any part of this job ticket. If no job ID is specified, use the jobname. |
| Copies to print | Always | From the general attributes on the job ticket. Note: this value prints on the header sheet. Save value for next invocation of dialog. |
| Proof | Always | Set Copies to print to 1 (but allow to be changed). For IP 4000, set optimize-for-multiple-copies to false. When this field is unchecked, reset the value to the value from the general attributes on the job ticket (and for IP 4000, set optimize-for-multiple-copies to true). Value not saved for next invocation of dialog. |
| Pages to Print | Always | Update whenever an item is checked or unchecked until Pages to Print is manually changed. |
| Separator Sheets | Disable for IC 70 | Values are start, sep, end. When multiple boxes are checked, append the appropriate value. For example when Start and Slipsheet are checked the value is start-sep. When Slipsheet and End are checked, the value is sep-end. |
| Stacker | Disable for IC 70 Disable for IP 60 | |
| Item column | Always | List all items in current document. Check the currently selected item. If the document is currently selected, check all items. |
| Files to print column | Always | If the .rip file exists for an item and it is newer than the item's file, use the .rip file as the file to print. If the .rip file is older than the item's file, use the item's file as the file to print. If printing .pdf.files will be supported and the Print PDF file option is checked in the Preferences dialog, use the .pdf file when the .rip file does not exist or is older than the .pdf or item file and the .pdf is newer than the item's file. This column should also include information about the creation or modification date of the file to print. Note: When the printer type is IC 70, this column always shows the item's file. |
| Check all | Always | Checks all the items |
| Uncheck all | Always | Unchecks all the items |
| ReRIP all | Disabled for IC 70 | Changes the file to print for all items to be the item's file. |
| ReRIP selected | Disabled for IC 70 | Where the RIP file exists, changes the file to print for the selected items to be the item's file. |

TABLE 9

SCHEDULE PAGE

Description

| pd attribute | Label | Control | Values | Default |
|---|---|---|---|---|
| job-rip-action job-hold | RIP Options •Use server default •Hold •RIP only •RIP then hold •Print | Group box with radio buttons | | Use server default |
| job-priority job-complexity | General | Group box | | |
| | •Priority | entry field with spinbox | 1–10 | 5 |
| | •Complexity | entry field with spin box | 1–10 | 1 |
| job-retention-period | Save job at server | Group box | | Do not save at server |
| job-retain-until | Do not save at server | Radio button | | |
| | Save for | Radio button with entry field and drop down list | | 1 Day |
| | Save until | Radio button with | | |
| | | month drop down list | January–December | current month |
| | | day drop down list | # days in the month | current day |
| | | year drop down combo | any future year | current year |
| | Time | hours drop down | 0:00–23:00 | 23:00 |

TABLE 9-continued

SCHEDULE PAGE

| | | | | |
|---|---|---|---|---|
| | | list | (whole hours only) | |
| job-deadline-time | Print by | Group box check box | | unchecked |
| | | month drop down list | January–December | current month |
| | | day drop down list | # days in the month | current day |
| | | year drop down combo | any future year | current year |
| | Time | hours drop down list | 0:00–23:00 (whole hours only) | 23:00 |

Behavior

| Label | Available | Behavior |
|---|---|---|
| RIP Options | Disabled for IC 70 | •Use server defaults - do not send job-rip-action or job hold<br>•Hold - set job-hold=true and job-rip-action=rip-and-print<br>•Otherwise - set job-rip-action to setting indicated by radio button and set job-hold=false |
| General | Disable for IC 70 | •set job-priority to value * 10<br>•set job-complexity to value in spin box |
| Save job at server | Always | |
| Do not save at server | Always | Do not send job-retention-period or job-retain-until. Disable For and Until date/time fields. |
| Save for | Date/time fields disabled when For is not selected | Enable date/time fields. Send value for job-retention-period. If days is set, multiply value by 24 before sending. |
| Save until | Date/time fields disabled when Until is not selected | Enable date/time fields. Send value for job-retain-until. |
| Print by | Always | Enable date/time fields when checked. Disable date/time fields when not checked. Send job-deadline-time to values specified din date/time fields. |

What is claimed is:

1. A method of creating a job ticket on a computer, wherein the job ticket includes information on components and print attributes of a print job, comprising the steps of:
   (a) creating a job ticket, wherein the job ticket includes:
       (1) an identification record including information identifying the job ticket;
       (2) a document record including information on a document included in the print job and print attributes for the document;
       (3) an item record including information on an item that is a component of the document and print attributes for the item, wherein the item record is arranged in a lower hierarchical relationship to the document record, and wherein the print attributes for the document apply to the item;
   (b) processing the job ticket; and
   (c) transmitting the processed job ticket to a printer.

2. The method of claim 1, wherein the step of creating the job ticket further includes the step of creating a record including information on scheduling options for the print job.

3. The method of claim 1, wherein the item identified in the item record is a print file that includes data representing graphical images, wherein the print file is stored in a computer readable medium, and wherein the item record further includes information on a location of the print file.

4. A method of creating a job ticket on a computer, wherein the job ticket includes information on components and print attributes of a print job, comprising:
   (a) creating a job ticket, wherein the job ticket includes:
       (1) an identification record including information identifying the job ticket;
       (2) a document record including information on a document included in the print job and print attributes for the document;
       (3) an item record including information on an item that is a component of the document and print attributes for the item, wherein the item record is arranged in a lower hierarchical relationship to the document record, wherein the print attributes for the document apply to the item, and wherein the item identified in the item record is a print file that includes data representing graphical images, wherein the print file is stored in a computer readable medium, and wherein the item record further includes information on a location of the print file;
   processing the job ticket with the computer to perform:
       (1) accessing the file identified in the item record based on the file location information;
       (2) transmitting the processed job ticket and a copy of the accessed file over a network to a server;
       (3) generating with the server a print file from the processed job ticket and transmitted file; and
       (4) transmitting the print file from the server to a printer.

5. A method of creating a job ticket on a computer, wherein the job ticket includes information on components and print attributes of a print job, comprising:
   (a) creating a job ticket, wherein the job ticket includes:
       (1) an identification record including information identifying the job ticket;
       (2) a document record including information on a document included in the print job and print attributes for the document;

(3) an item record including information on an item that is a component of the document and print attributes for the item, wherein the item record is arranged in a lower hierarchical relationship to the document record, and wherein the print attributes for the document apply to the item, and wherein the item is a member of the set of items comprising: a print image file; a hardcopy file including a list of TIFF files; a library file stored in a library storage device within a server in communication with the computer; variable data describing customized printing options; and an inventory item including information on an object to be included with the print job;

(b) processing the job ticket; and (c) transmitting the processed job ticket to a printer.

6. The method of claim 1, wherein the print attribute information is a member of the set of information comprising a layout of a printed page, a model name of a printer on which to print, shading of printed matter printed on the page, and alignment of the printed matter on the printed page.

7. The method of claim 1, wherein the job ticket further includes:

(a) a second item record including information on a second item and print attributes therefor, wherein the second item is a second component of the document, wherein the second item is in a lower hierarchical relation to the document; and (b) a part record associated with both item records and including print attribute information, wherein the part record is in a lower hierarchical relation to the document record and in a higher hierarchical relation to both item records, wherein the print attributes in the document record apply to the part record, and wherein the print attributes that apply to the part record apply to both the item records.

8. The method of claim 1, wherein a monitor and input device are attached to the computer and wherein the step of creating the job ticket further includes the steps of:

(a) displaying a job ticket identification field on the monitor of the computer in which information identifying the print job is entered using the input device;

(b) displaying a document field on the monitor of the computer in which information on the document included in the print job is entered using the input device;

(c) displaying an item field on the monitor in which information on the item is entered using the input device;

(d) displaying print attribute fields for a selected document record and item record in which information on the print attributes of the selected document record and item record is entered using the input device; and (e) storing the entered information in the job ticket.

9. The method of claim 8, wherein the steps of displaying the job ticket identification field, document field, item field, and print attribute fields further includes the steps of displaying these fields in a GUI and further including the step of displaying in the GUI a graphical representation of the hierarchical relationship between the document and the item.

10. The method of claim 9, wherein the step of displaying the print attribute fields for a selected document record and item record further includes the steps of:

(a) displaying in the GUI a graphical representation of at least two tabs, wherein each tab identifies a page that is associated with at least one of the print attribute fields; and (b) displaying in the GUI the page and the print attribute fields associated therewith upon a selection of the tab associated with such page with the input device.

11. The method of claim 1, wherein the print attribute information is stored in the job ticket as a key/value pair, wherein the key describes the attribute and the value describes a value for the attribute identified by the key.

12. The method of claim 1, wherein a database stores item records, wherein a program performs the steps of creating and processing the job ticket, wherein the format of the item records in the database is incompatible with the program, further including the steps of:

wherein the step of creating the job ticket further includes the step of the program making a call to the database for an item record therein;

converting with an application program interface the called item record in the database to a format compatible with the program when the program calls the database for the item record therein; and wherein the step of creating the job ticket further includes the step of adding the converted item record to the job ticket.

13. A computer system for creating a job ticket, wherein the job ticket includes information on components and print attributes of a print job, comprising:

(a) means, performed by the computer system, for adding to the job ticket information identifying the job ticket;

(b) means, performed by the computer system, for adding to the job ticket a document record including information on a document included in the print job and print attributes for the document;

(c) means, performed by the computer system, for adding to the job ticket an item record including information on an item that is a component of the document and print attributes for the item, wherein the item record is arranged in a lower hierarchical relationship to the document record, and wherein the print attributes for the document apply to the item;

(d) means, performed by the computer system, for processing the job ticket; and (e) means, performed by the computer system, for transmitting the processed job ticket to a printer.

14. The apparatus of claim 13, further including means, performed by the computer system for adding information on scheduling options for the print job to the job ticket.

15. The apparatus of claim 13, wherein the item identified in the item record is a print file that includes data representing graphical images, wherein the print file is stored in a computer readable medium, and further including means, performed by the computer, for adding information on a location of the print file to the item record.

16. A computer system for creating a job ticket, wherein the iob ticket includes information on components and print attributes of a print job, wherein the computer system is comprised of a computer and a server linked together over a network, comprising:

(a) means, performed by the computer system, for adding to the job ticket information identifying the job ticket;

(b) means, performed by the computer system, for adding to the job ticket a document record including information on a document included in the print job and print attributes for the document;

(c) means, performed by the computer system, for adding to the job ticket an item record including information on an item that is a component of the document and print attributes for the item, wherein the item record is arranged in a lower hierarchical relationship to the document record, wherein the print attributes for the document apply to the item, and wherein the item identified in the item record is a print file that includes data representing graphical images, wherein the print file is stored in a computer readable medium, and wherein the item record further includes information on a location of the print file;

(d) means, performed by the computer, for accessing the file identified in the item record using the file location information;

(e) means, performed by the computer, for transmitting the processed job ticket and a copy of the accessed file over the network to the server;

(f) means, performed by the server, for generating a print file from the processed job ticket and transmitted file; and (g) means, performed by the server, for transmitting the print file to a printer.

17. A computer system for creating a job ticket, wherein the iob ticket includes information on components and print attributes of a print job, comprising:

(a) means, performed by the computer system, for adding to the job ticket information identifying the job ticket;

(b) means, performed by the computer system, for adding to the job ticket a document record including information on a document included in the print job and print attributes for the document;

(c) means, performed by the computer system, for adding to the job ticket an item record including information on an item that is a component of the document and print attributes for the item, wherein the item record is arranged in a lower hierarchical relationship to the document record, and wherein the print attributes for the document apply to the item, and wherein the item is a member of the set of items comprising: a print image file; a hardcopy file including a list of TIFF files; a library file stored in a library storage device within a server in communication with the computer; variable data describing customized printing options; and an inventory item including information on an object to be included with the print job;

(d) means, performed by the computer system, for processing the job ticket; and (e) means performed by the computer system, for transmitting the processed job ticket to a printer.

18. The apparatus of claim 13, wherein the print attribute information is a member of the set of information comprising a layout of a printed page, a model name of a printer on which to print, shading of printed matter printed on the page, and alignment of the printed matter on the printed page.

19. The apparatus of claim 13, further including:

(a) means, performed by the computer system, for adding to the job ticket a second item record including information on a second item that is second component of the document and print attribute information for the second item, and wherein the second item is in a lower hierarchical relation to the document; and (b) means, performed by the computer system, for adding to the job ticket a part record associated with both item records and print attributes for the part record, wherein the part record is in a lower hierarchical relation to the document record and in a higher hierarchical relation to both item records, wherein the print attributes in the document record apply to the part record, and wherein the print attributes that apply to the part record apply to both the item records.

20. The apparatus of claim 13, further including:

(a) a monitor attached to the computer system;

(b) an input device attached to the computer system;

(c) wherein the means, performed by the computer system, for adding to the job ticket the identification record, the document record, and the item record, further includes:

(1) means, performed by the computer system, for displaying a job ticket identification field on the monitor in which information identifying the print job is entered using the input device;

(2) means, performed by the computer system, for displaying a document field on the monitor in which information on the document included in the print job is entered using the input device;

(3) means, performed by the computer system, for displaying an item field on the monitor in which information on the item is entered using the input device;

(4) means, performed by the computer system, for displaying print attribute fields for a selected document record and item record in which information on the print attributes of the selected document record and item record is entered using the input device; and (d) means, performed by the computer system, for storing the entered information in the job ticket.

21. The apparatus of claim 20, further including:

means, performed by the computer system, for displaying the job ticket identification field, document field, item field, and print attribute fields in a GUI; and means, performed by the computer system, for displaying in the GUI a graphical representation of the hierarchical relationship between the document and the item.

22. The apparatus of claim 21, wherein the means for displaying the print attribute fields for a selected document record and item record further includes:

(a) means for displaying in the GUI a graphical representation of at least two tabs, wherein each tab identifies a page that is associated with at least one of the print attribute fields; and (b) means for displaying in the GUI the page and the print attribute fields associated therewith upon a selection with the input device of the tab identifying the page.

23. The apparatus of claim 13, wherein the means for adding print attribute information to the job ticket further includes means for storing the print attribute information in the job ticket as a key/value pair, wherein the key describes the attribute and the value describes a value for the attribute identified by the key.

24. The apparatus of claim 13, further including:

a database storing item records;

a program performing the steps of creating and processing the job ticket, wherein the format of the item records in the database is incompatible with the program;

means, performed by the program, for making a call to the database for an item record therein;

means, performed by an application program interface, for converting the called item record in the database to a format compatible with the program when the program calls the database for the item record therein; and means, performed by the program, for adding the converted item record to the job ticket.

25. An article of manufacture for use in programming a computer system, the article of manufacture comprising, a computer-readable storage medium having a computer program embodied therein that causes the computer system to perform the steps of:

(a) adding to a job ticket including information on components and print attributes of a print job an identification record including information identifying the job ticket;

(b) adding to the job ticket a document record including information on a document included in the print job and print attributes for the document;

(c) adding to the job ticket an item record including information on an item that is a component of the document and print attributes for the item, wherein the item record is arranged in a lower hierarchical relationship to the document record, and wherein the print attributes for the document apply to the item;

(d) processing the job ticket; and (e) transmitting the processed job ticket to a printer.

26. The article of manufacture of claim 25, further performing the step of adding to the job ticket a record including information on scheduling options for the print job.

27. The article of manufacture of claim 25, wherein the item identified in the item record is a print file that includes data representing graphical images, wherein the print file is stored in a computer readable medium, and further including the step of adding to the item record information on a location of the print file.

28. An article of manufacture for use in programming a computer system, wherein the computer system is comprised of a computer and a server linked together over a network, the article of manufacture comprising a computer-readable storage medium having a computer program embodied therein that causes the computer to perform:

(a) adding to a job ticket including information on components and print attributes of a print job an identification record including information identifying the iob ticket;

(b) adding to the job ticket a document record including information on a document included in the print job and print attributes for the document;

(c) adding to the job ticket an item record including information on an item that is a component of the document and print attributes for the item, wherein the item record is arranged in a lower hierarchical relationship to the document record, and wherein the print attributes for the document apply to the item;

(d) accessing the file identified in the item record using the file location information;

(e) transmitting with the computer the processed job ticket and a copy of the accessed file over the network to the server;

(f) generating with the server a print file from the processed job ticket and transmitted file; and (g) transmitting from the server the print file to a printer.

29. An article of manufacture for use in programming a computer system, the article of manufacture comprising a computer-readable storage medium having a computer program embodied therein that causes the computer system to perform:

(a) adding to a job ticket including information on components and print attributes of a print job an identification record including information identifying the job ticket;

(b) adding to the job ticket a document record including information on a document included in the print job and print attributes for the document;

(c) adding to the job ticket an item record including information on an item that is a component of the document and print attributes for the item, wherein the item record is arranged in a lower hierarchical relationship to the document record, wherein the print attributes for the document apply to the item, and wherein the item is a member of the set of items comprising: a print image file; a hardcopy file including a list of TIFF files; a library file stored in a library storage device within a server in communication with the computer; variable data describing customized printing options; and an inventory item including information on an object to be included with the print job;

(d) processing the job ticket; and (e) transmitting the processed job ticket to a printer.

30. The article of manufacture claim 25, wherein the print attribute information is a member of the set of information comprising a layout of a printed page, a model name of a printer on which to print, shading of printed matter printed on the page, and alignment of the printed matter on the printed page.

31. The article of manufacture of claim 25, further performing the steps of:

(a) adding to the job ticket a second item record including information on a second item and print attributes therefor that is a second component of the document, wherein the second item is in a lower hierarchical relation to the document; and (b) adding to the job ticket a part record associated with both item records and including print attribute information, wherein the part record is in a lower hierarchical relation to the document record and in a higher hierarchical relation to both item records, wherein the print attributes in the document record apply to the part record, and wherein the print attributes that apply to the part record apply to both the item records.

32. The article of manufacture of claim 25, wherein a monitor and input device are attached to the computer system and wherein the step of adding to the job ticket the identification record, the document record, and the item record, further includes performing the steps of:

(a) displaying a job ticket identification field on the monitor in which information identifying the print job is entered using the input device;

(b) displaying a document field on the monitor in which information on the document included in the print job is entered using the input device;

(c) displaying an item field on the monitor in which information on the item is entered using the input device;

(d) displaying print attribute fields for a selected document record and item record in which information on the print attributes of the selected document record and item record is entered using the input device; and (e) storing the entered information in the job ticket.

33. The article of manufacture of claim 32, further performing the steps of:

displaying a GUI in which the job ticket identification field, the document field, the item field, and the print attribute fields are displayed; and displaying in the GUI a graphical representation of the hierarchical relationship between the document and the item.

34. The article of manufacture of claim 33, wherein the steps of displaying the print attribute fields for a selected document record and item record further includes the steps of:

(a) displaying in the GUI a graphical representation of at least two tabs, wherein each tab identifies a page that is associated with at least one of the print attribute fields; and (b) displaying in the GUI the page and the print attribute fields associated therewith upon a selection of the tab associated with such page with the input device.

35. The article of manufacture of claim 25, wherein the print attribute information is stored in the job ticket as a key/value pair, wherein the key describes the attribute and the value describes a value for the attribute identified by the key.

36. The article of manufacture of claim 25, wherein a database stores item records, wherein a program performs the steps of creating and processing the job ticket, wherein the format of the item records in the database is incompatible with the program, further including the steps of:
   wherein the step of creating the job ticket further includes the step of the program making a call to the database for an item record therein;
   converting with an application program interface the called item record in the database to a format compatible with the program when the program calls the database for the item record therein; and
   wherein the step of creating the job ticket further includes the step of adding the converted item record to the job ticket.

37. A system for use by a print shop to fulfill a customer order, the system comprising:
   a job ticket data structure, stored on a computer usable medium within a network of computers connected to a print server connected to a plurality of printers, said job ticket capable of identifying a plurality of documents to be printed as a part of the customer order, each document having a capability to have separate print attributes; said job ticket capable of identifying a plurality of item records associated with each document record, each item record having a capability to have separate print attributes or attributes inherited from the associated document, wherein an item record is capable of identifying an image file, variable data for customizing an associated document, and non-printable inventory items to be packaged with the associated document in fulfilling the customer order;
   means for transmitting the job ticket, and each item and document referenced in the job ticket and stored as a file within the network, to the print server;
   means for printing the stored documents and items at more than one printer connected to the network; and
   means for printing a cover sheet, for each document or item printed at a printer, including information identifying all documents and items identified within the job ticket;
   whereby the job ticket maintains information on each component of the customer order, all information needed by a print server to print each document within the customer order, and all information needed to assemble the components in fulfilling the customer order.

38. A method for use by a print shop to fulfill a customer order, the method comprising:
   creating, within a network of computers connected to a print server connected to a plurality of printers, an electronic job ticket capable of identifying a plurality of documents to be printed as a part of the customer order, each document having a capability to have separate print attributes; said job ticket capable of identifying a plurality of item records associated with each document record, each item record having a capability to have separate print attributes or attributes inherited from the associated document, wherein an item record is capable of identifying an image file, variable data for customizing an associated document, and non-printable inventory items to be packaged with the associated document in fulfilling the customer order;
   transmitting the job ticket, and each item and document referenced in the job ticket and stored as a file within the network, to the print server;
   printing the stored documents and items at more than one printer connected to the network;
   printing a cover sheet, for each document or item printed at a printer, including information identifying all documents and items identified within the job ticket; and
   assembling all documents and items from the printers along with any non-printable inventory items identified on the cover sheet to fulfill the customer order.

39. A system for use by a print ship to fulfill a customer order, the system comprising:
   means for maintaining, within a job ticket data structure within a computer system, information on each component of the customer order, including an identity and location of each one of a plurality of documents to be printed as a part of the customer order and of each one of a plurality of item records associated with at least one of the documents wherein an item record may represent variable data customizing the associated document or a non-printable inventory item to be packaged with the associated document in fulfilling the customer order;
   means for maintaining, within the job ticket data structure, print attribute information needed by a print server to print each document, as customized by any item record, within the customer order;
   means for maintaining, within the job ticket data structure, information needed to assemble the printed and non-printable components in fulfilling the customer order;
   means for retrieving, from the locations specified, the documents and items identified in the job ticket;
   means for sending the retrieved document and items to a print server;
   means for printing the documents and items according to the print attribute information on a plurality of printers with each printer printing out a cover sheet indicating the assembly of all components in fulfilling the customer order.

40. A system for use by a print shop to fulfill a customer order, the system comprising:
   a job ticket data structure, stored on a computer usable medium within a network of computers connected to a print server connected to a plurality of printers;
   said job ticket having a capability to identify a plurality of documents and a plurality of items associated with each document for printing, and having a capability to identify non-printable items to be assembled with an associated document, wherein the documents and items are components of the customer order;
   said job ticket data structure having means for maintaining information on each component of the customer order; means for maintaining print attribute information that directs the print server how to print each document and item within the customer order, and means for maintaining information needed to assemble the components, including printable and non-printable items, in fulfilling the customer order.

41. The system of claim 40 wherein the job ticket structure further comprises means for specifying a location of the documents and items to be printed.

42. The system of claim 41 further comprising means for retrieving the documents and items to be printed from the location specified and sending the documents and files to a print server for printing by a plurality of printers according to the print attribute information.

* * * * *